(12) United States Patent
Wang et al.

(10) Patent No.: US 12,007,657 B2
(45) Date of Patent: Jun. 11, 2024

(54) DISPLAY PANEL AND DISPLAY DEVICE WITH INCREASED SCREEN-TO-BODY RATIO WITHOUT AFFECTING PHOTOSENSITIVE ELEMENT FUNCTION

(71) Applicant: Xiamen Tianma Micro-Electronics Co., Ltd., Xiamen (CN)

(72) Inventors: Hailiang Wang, Xiamen (CN); Yaying Li, Xiamen (CN); Yan Yang, Xiamen (CN); Ting Zhou, Xiamen (CN); Junyi Li, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 309 days.

(21) Appl. No.: 17/107,088

(22) Filed: Nov. 30, 2020

(65) Prior Publication Data

US 2022/0100022 A1    Mar. 31, 2022

(30) Foreign Application Priority Data

Sep. 30, 2020 (CN) .......................... 202011065281.0

(51) Int. Cl.
*G02F 1/1362* (2006.01)
*G02F 1/1335* (2006.01)
*G02F 1/1368* (2006.01)
*G02F 1/1333* (2006.01)

(52) U.S. Cl.
CPC .. *G02F 1/136295* (2021.01); *G02F 1/133512* (2013.01); *G02F 1/133514* (2013.01); *G02F 1/136209* (2013.01); *G02F 1/136227* (2013.01); *G02F 1/13685* (2021.01); *G02F 1/13338* (2013.01); *G02F 1/136218* (2021.01); *G02F 2201/52* (2013.01)

(58) Field of Classification Search
CPC ......... G02F 1/133514; G02F 1/136286; G02F 1/136295; G02F 2201/52
See application file for complete search history.

(56) References Cited

U.S. PATENT DOCUMENTS

| | | | |
|---|---|---|---|
| 2017/0016930 A1* | 1/2017 | Qiu | .................. G02F 1/1313 |
| 2020/0052048 A1* | 2/2020 | Kuo | .................. H10K 59/65 |
| 2020/0135148 A1* | 4/2020 | Bai | .................. G09G 3/20 |
| 2021/0408088 A1* | 12/2021 | Ban | .................. G02F 1/13312 |

FOREIGN PATENT DOCUMENTS

| | | | |
|---|---|---|---|
| CN | 207264062 U | | 4/2018 |
| CN | 109981855 A | * | 7/2019 |
| CN | 109981855 A | | 7/2019 |

* cited by examiner

*Primary Examiner* — Paisley L Wilson
(74) *Attorney, Agent, or Firm* — Anova Law Group, PLLC

(57) ABSTRACT

A display panel and a display device are provided. The display panel includes a first display region and a second display region that are arranged adjacent to each other. The second display region is multiplexed as a photosensitive element dispousure region. The first display region includes first sub-pixels, and the second display region includes second sub-pixels and third sub-pixels. The display panel also includes a first substrate and a second substrate that are oppositely disposed. The first substrate is provided with a plurality of signal lines, the plurality of signal lines at least include scan lines and data lines, and the scan lines and the data lines are isolated and crossed to define regions where the first sub-pixel, the second sub-pixel, and the third sub-pixel are located. A signal line of the plurality of signal lines in the second display region is made of a transparent conductive material.

21 Claims, 16 Drawing Sheets

DISPLAY PANEL AND DISPLAY DEVICE WITH INCREASED SCREEN-TO-BODY RATIO WITHOUT AFFECTING PHOTOSENSITIVE ELEMENT FUNCTION

CROSS-REFERENCE TO RELATED APPLICATION

This application claims the priority of Chinese patent application No. 202011065281.0, filed on Sep. 30, 2020, the entirety of which is incorporated herein by reference.

FIELD

The present disclosure generally relates to the field of display technology and, more particularly, relates to a display panel and a display device.

BACKGROUND

Current display devices include display panels, which mainly include a liquid crystal display panel and an organic light-emitting display panel. To further increase the screen-to-body ratio, a display technology where a front camera is disposed under the screen by digging a hole in a visible area, while the region just above the camera cannot display normally, such as "notch screen" or "water-drop screen", appears. After the "notch screen" or "water-drop screen", to further increase the screen-to-body ratio of the liquid crystal display screen, more and more manufacturers have begun to propose new structures for the "front camera" design, such as lifting camera, sliding-cover full screen, side-sliding lifting camera, or digging-hole full screen, etc. Although the design of lifting camera, side-sliding camera, or sliding-cover full screen effectively solves the contradiction between the front camera and the screen-to-body ratio, the complexity of the internal structure and the manufacturing cost increase, at the same time, the mechanism occupies the entire machine space, and, thus, the battery layout, the entire machine volume and weight are all affected. The digging-hole full screen effectively solves the contradiction between the front camera and the screen-to-body ratio while keeping the original body structure unchanged. However, due to the existence of the digging-hole, the overall visual experience of the screen is affected. With the development of display technology, the display device develops towards a super-large screen-to-body ratio (e.g., a ratio of the display region over the entire front of the display device) and even full-screen display. How to ensure the photographing effect of the camera while increasing the screen-to-body ratio of the display device has become a research hotspot for those skilled in the art.

Therefore, how to provide a display panel and a display device that are capable of increasing the screen-to-body ratio to achieve full-screen display without affecting the use effect of the photosensitive element (such as cameras) is an urgent technical problem that needs to be solved. The disclosed display panel and display device are directed to solve one or more problems set forth above and other problems.

SUMMARY

One aspect of the present disclosure provides a display panel. The display panel includes a first display region and a second display region that are arranged adjacent to each other. The second display region is multiplexed as a photosensitive element disposure region. The first display region includes a plurality of first pixels arranged in an array, and a first pixel of the plurality of first pixels includes a plurality of first sub-pixels with different colors. The second display region includes a plurality of second pixels arranged in an array, and a second pixel of the plurality of second pixels includes a first region and a second region. The first region has an area less than or equal to the second region. The first region includes a plurality of second sub-pixels with different colors, and the second region includes a plurality of third sub-pixels. A first sub-pixel of the plurality of first sub-pixels has an area less than a second sub-pixel of the plurality of second sub-pixels, and the second sub-pixel has an area less than or equal to a third sub-pixel of the plurality of third sub-pixels. The display panel also includes a first substrate and a second substrate that are oppositely disposed. The first substrate is provided with a plurality of signal lines, the plurality of signal lines at least include scan lines and data lines, and the scan lines and the data lines are isolated and crossed to define regions where the first sub-pixel, the second sub-pixel, and the third sub-pixel are located. A signal line of the plurality of signal lines in the second display region is made of a transparent conductive material.

Another aspect of the present disclosure provides a display device. The display device includes a display panel. The display panel includes a first display region and a second display region that are arranged adjacent to each other. The second display region is multiplexed as a photosensitive element disposure region. The first display region includes a plurality of first pixels arranged in an array, and a first pixel of the plurality of first pixels includes a plurality of first sub-pixels with different colors. The second display region includes a plurality of second pixels arranged in an array, and a second pixel of the plurality of second pixels includes a first region and a second region. The first region has an area less than or equal to the second region. The first region includes a plurality of second sub-pixels with different colors, and the second region includes a plurality of third sub-pixels. A first sub-pixel of the plurality of first sub-pixels has an area less than a second sub-pixel of the plurality of second sub-pixels, and the second sub-pixel has an area less than or equal to a third sub-pixel of the plurality of third sub-pixels. The display panel also includes a first substrate and a second substrate that are oppositely disposed. The first substrate is provided with a plurality of signal lines, the plurality of signal lines at least include scan lines and data lines, and the scan lines and the data lines are isolated and crossed to define regions where the first sub-pixel, the second sub-pixel, and the third sub-pixel are located. A signal line of the plurality of signal lines in the second display region is made of a transparent conductive material.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION OF THE DISCLOSURE

Reference will now be made in detail to exemplary embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

Similar reference numbers and letters represent similar terms in the following Figures, such that once an item is defined in one Figure, it does not need to be further discussed in subsequent Figures.

To increase the screen-to-body ratio and to achieve a full-screen display, a scheme of under-screen camera has been designed. The under-screen camera refers to that a photosensitive element in the display device (such as a front camera) is placed under the screen. When the photosensitive element is not working, the display device displays an image at a position corresponding to the photosensitive element. When the photosensitive element is working, the display device at the position corresponding to the photosensitive element is transparent, and the photosensitive element receives the external light passing through the display device to achieve the preset function (such as camera function). However, in existing technology, the screen of the display panel at the position corresponding to the photosensitive element has a regular array pattern, which forms a grating. When the camera is working, if there is a strong light source in the camera region, diffraction and interference occur and affect the quality of the photo. Therefore, improving the full-screen display effect and improving the effect of camera function cannot be simultaneously satisfied.

The present disclosure provides a display panel and a display device, which may increase the screen-to-body ratio to improve the full-screen display effect, and at the same time, may not affect the use effect of photosensitive element such as the camera.

Figure 1:
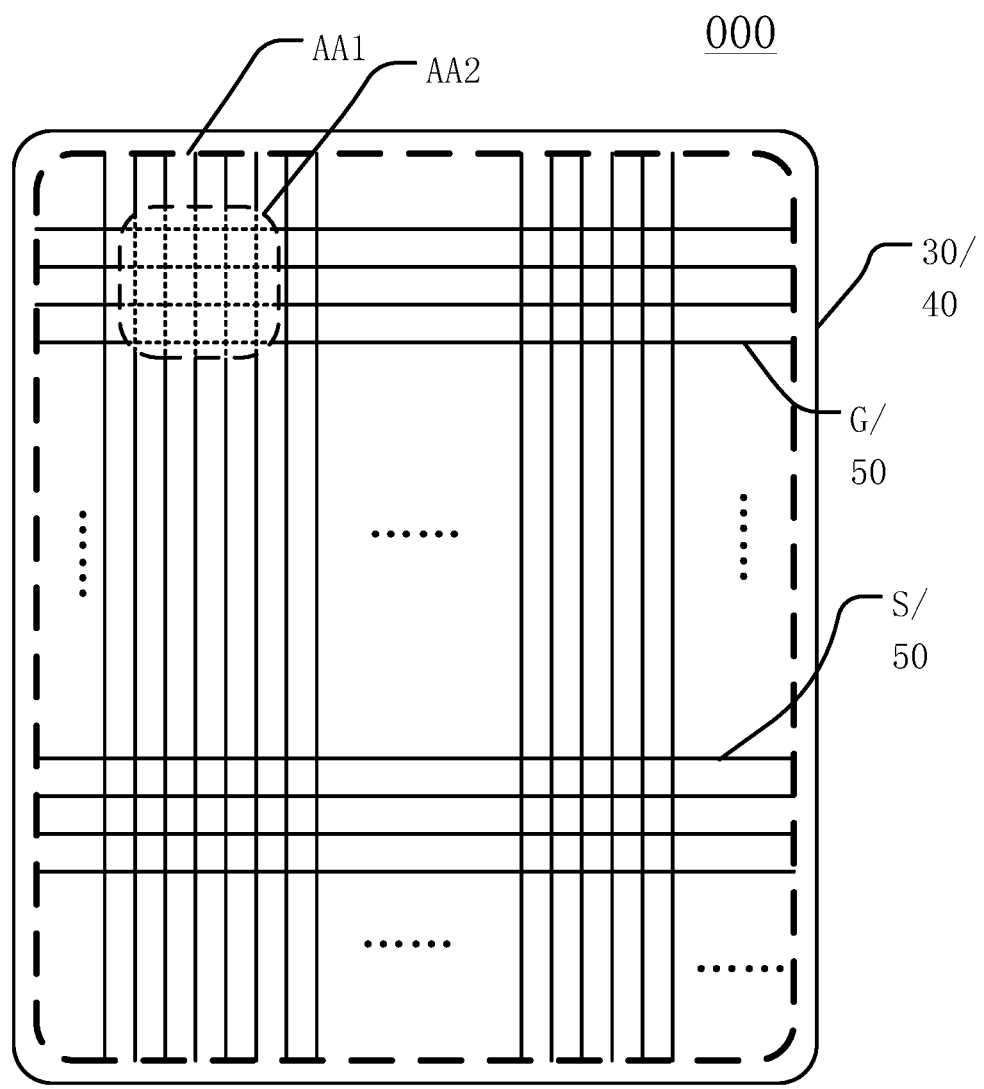
FIG. 1 illustrates a schematic top-view of an exemplary display panel consistent with disclosed embodiments of the present disclosure.
Figure 2:
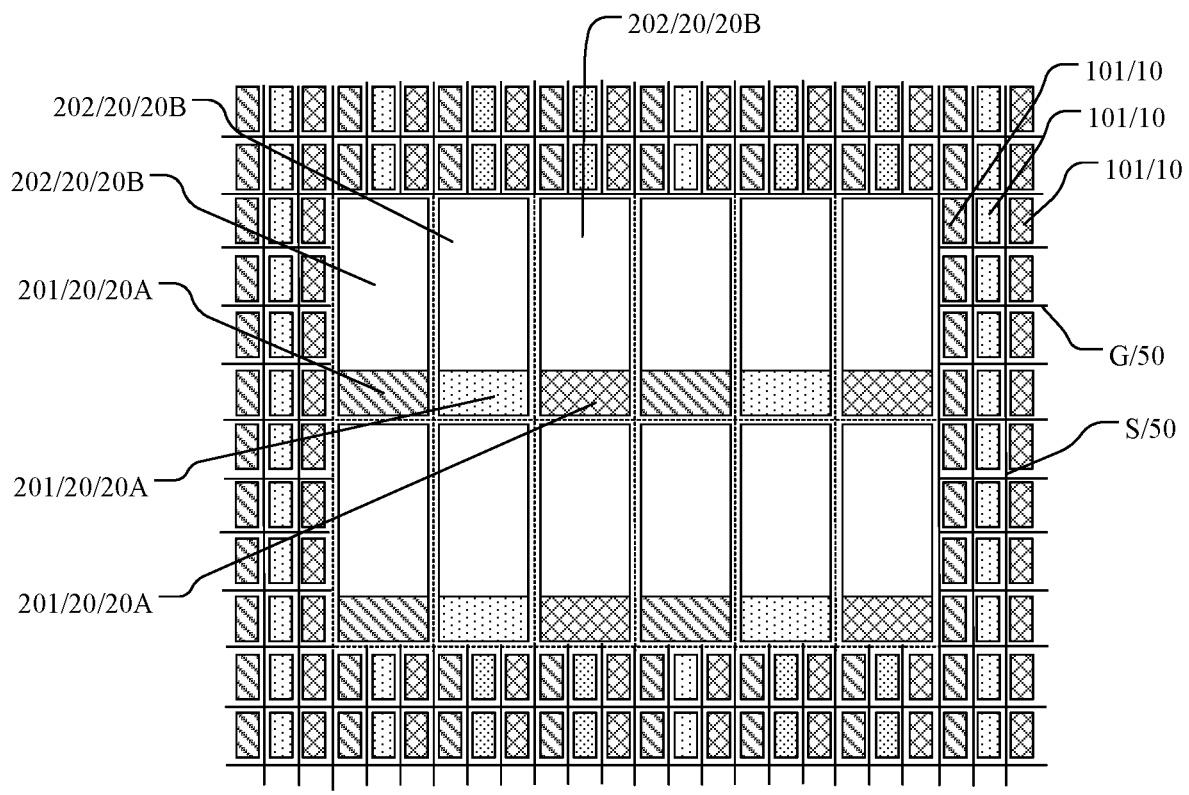
FIG. 2 illustrates a schematic local zoom-in view of an exemplary structure in FIG. 1 consistent with disclosed embodiments of the present disclosure.

FIG. 1 illustrates a schematic top-view of a display panel consistent with disclosed embodiments of the present disclosure; and FIG. 2 illustrates a schematic local zoom-in view of the structure in FIG. 1. Referring to FIG. 1 and FIG. 2, a display panel 000 in the present disclosure may include a first display region AA1 and a second display region AA2 that are arranged adjacent to each other. The second display region AA2 may be multiplexed as a photosensitive element disposure region.

The first display region AA1 may include a plurality of first pixels 10 arranged in an array. The first pixel 10 may include a plurality of first sub-pixels 101 with different colors, which may be distinguished by different filling patterns in FIG. 2. For illustrative purposes, the first pixel 10 may include three first sub-pixels 101 with different colors as an example.

The second display region AA2 may include a plurality of second pixels 20 arranged in an array. For illustrative purposes, the second pixel 20 in FIG. 2 may include three second sub-pixels 201 with different colors and three third sub-pixels 202 with different colors as an example. The second pixel 20 may include a first region 20A and a second region 20B. An area of the first region 20A may be less than or equal to an area of the second region 20B. The first region 20A may include a plurality of second sub-pixels 201 with different colors, which may be distinguished by different filling patterns in FIG. 2. The second region 20B may include a plurality of third sub-pixels 202. The first region 20A in FIG. 2 may be the region where the three second sub-pixels 201 with different colors are located, and the second region 20B may be the region where three third sub-pixels 202 are located.

Further, an area of the first sub-pixel 101 may be smaller than an area of the second sub-pixel 201, and the area of the second sub-pixel 201 may be smaller than or equal to an area of the third sub-pixel 202. For illustrative purposes, FIG. 2 illustrates that the area of the second sub-pixel 201 is smaller than the area of the third sub-pixel 202 as an example.

The display panel 000 may include a first substrate 30 and a second substrate 40 that are oppositely disposed. The first substrate 30 may be provided with a plurality of signal lines 50. The signal lines 50 may at least include a scan line G and a data line S. The scan lines G and data lines S may be isolated and crossed to define regions where the first sub-pixel 101, the second sub-pixel 201, and the third sub-pixel 202 are located.

The signal line 50 in the second display region AA2 may be made of a transparent conductive material (the transparent conductive material may be indicated by a dotted line in FIG. 1 and FIG. 2). In one embodiment, the transparent conductive material may include indium tin oxide (ITO), or any other conductive material with high transmittance, which may not be limited by the present disclosure.

Specifically, the display panel 000 in the present disclosure may include a first display region AA1 and a second display region AA2 that are arranged adjacent to each other. The second display region AA2 may be multiplexed as a photosensitive element disposure region while achieving the display function. A photosensitive element such as a camera may be disposed in the second display region AA2. The first display region AA1 may include a plurality of first pixels 10 arranged in an array. The first pixel 10 may include a plurality of first sub-pixels 101 with different colors. The second display region AA2 may include a plurality of second pixels 20 arranged in an array. The second pixel 20 may include the first region 20A and the second region 20B. An area of the first region 20A may be less than or equal to an area of the second region 20B. The first region 20A may include a plurality of second sub-pixels 201 with different colors, and the second region 20B may include a plurality of third sub-pixels 202.

During normal display, the first sub-pixel 101 in the first pixel 10 and the plurality of second sub-pixels 201 with different colors in the first region 20A of the second pixel 20 may emit light to achieve normal display. In other words, when the photosensitive element is not working, the first sub-pixel 101, the second sub-pixel 201, and the third sub-pixel 202 may jointly work, and the second display region AA2 and the first display region AA1 may display an image together to achieve the full-screen display effect of the display panel 000. The second region 20B of the second pixel 20 in the second display region AA2 may be a region that does not include the plurality of second sub-pixels 201 with different colors. In other words, when the photosensitive element is working, the second region 20B of the second pixel 20 in the second display region AA2 may be in a transparent state.

Optionally, the third sub-pixel 202 may be a white sub-pixel, or the second region 20B may be an overall transparent region, which may not be limited by the present disclosure. The second region 20B may have a high transmittance to provide conditions for the operation of the photosensitive element in the photosensitive element disposure region achieving the display function of the second display region AA2. In view of this, the photosensitive element disposed in the second display region AA2 may receive the external light passing through the second region 20B of the second pixel 20 to achieve the preset function (such as camera function).

To enable the transmittance of the second display region AA2 to meet the requirements of the photosensitive element for light sensitivity, in the present disclosure, the area of the first sub-pixel 101 may be smaller than the area of the second sub-pixel 201. In other words, a pixel density (Pixel Per Inch, PPI) of the second sub-pixels in the second display region AA2 may be smaller than a pixel density of the first sub-pixels 101 in the first display region AA1. Through setting the area of the first sub-pixel 101 to be smaller than the area of the second sub-pixel 201, the display brightness of the second display region AA2 may increase. In one embodiment, the area of the second sub-pixel 201 may be equal to an area of an integer number of first sub-pixels 101, to simplify the manufacturing process of the display panel 000.

The first substrate 30 of the display panel 000 in the present disclosure may be provided with the plurality of signal lines 50. The signal lines 50 may include a scan line G and a data line S, or any other signal line capable of transmitting display driving signal, which may not be specifically limited by the present disclosure. The scan line G and the data line S may be isolated and crossed to define regions where the first sub-pixel 101, the second sub-pixel 201, and the third sub-pixel 202 are located.

As disclosed, the signal line 50 in the second display region AA2 is made of an exemplary transparent conductive material. In contrast, when the signal line was made of a non-transparent material, a regular array pattern may be formed in the second display region AA2 of the display panel 000, and a grating may then be formed. By using the disclosed transparent conductive material for the signal line 50, when the second display region AA2 is multiplexed as a photosensitive element disposure region, the diffraction and interference phenomenon of the grating under the action of light upon operation of the photosensitive element may be prevented or reduced, thereby facilitating to increase the screen-to-body ratio, and to improve the use effect of the photosensitive element (such as the camera) while improving the display effect of the full-screen.

The display panel in the present disclosure may include a liquid crystal display panel, and light may be provided through a backlight unit (not illustrated). Further, the liquid crystal display panel may often include a color filter (CF) substrate, a thin film transistor (TFT) array substrate, and a liquid crystal layer disposed between the CF substrate and the TFT substrate. Any one of the first substrate 30 and the second substrate 40 may be one of the CF substrate and the TFT substrate. By applying a driving voltage to control the liquid crystal molecules in the liquid crystal layer to rotate, the light provided by the backlight unit may pass through the TFT array substrate of the liquid crystal display panel and may be refracted from the liquid crystal layer of the liquid crystal display panel, to generate a color image through the CF substrate.

The second region 20B of the second pixel 20 in the second display region AA2 in the present disclosure may be a region where the color filter is not provided. Optionally, one of the first substrate 30 and the second substrate 40 in the present disclosure may be the TFT substrate, and the other one may be the CF substrate, which may not be limited by the present disclosure, and may be determined according to requirements.

For illustrative purposes, FIG. 1 schematically illustrates the shape of the second display region AA2. In the specific implementation process, the second display region AA2 may have a regular shape, such as a right-angled rectangle, rounded rectangle, circle or oval, etc. Alternatively, the second display region AA2 may have an irregular shape, e.g., a drop shape. In practical applications, the shape of the second display region AA2 may be designed according to the shape of the photosensitive element disposed in the second display region AA2, which may not be limited by the present disclosure.

For illustrative purposes, FIG. 1 schematically illustrates the relative positional relationship between the first display region AA1 and the second display region AA2, which may not be limited herein. The relative positional relationship and shapes of the first display region AA1 and the second display region AA2 may not be limited, and may be specifically determined according to a screen design of the display panel 000. For example, the first display region AA1 may be arranged around the second display region AA2 (as shown in FIG. 1), or the second display region AA2 may be arranged at a corner or an edge of the first display region AA1, which may not be limited by the present disclosure.

Figure 3:
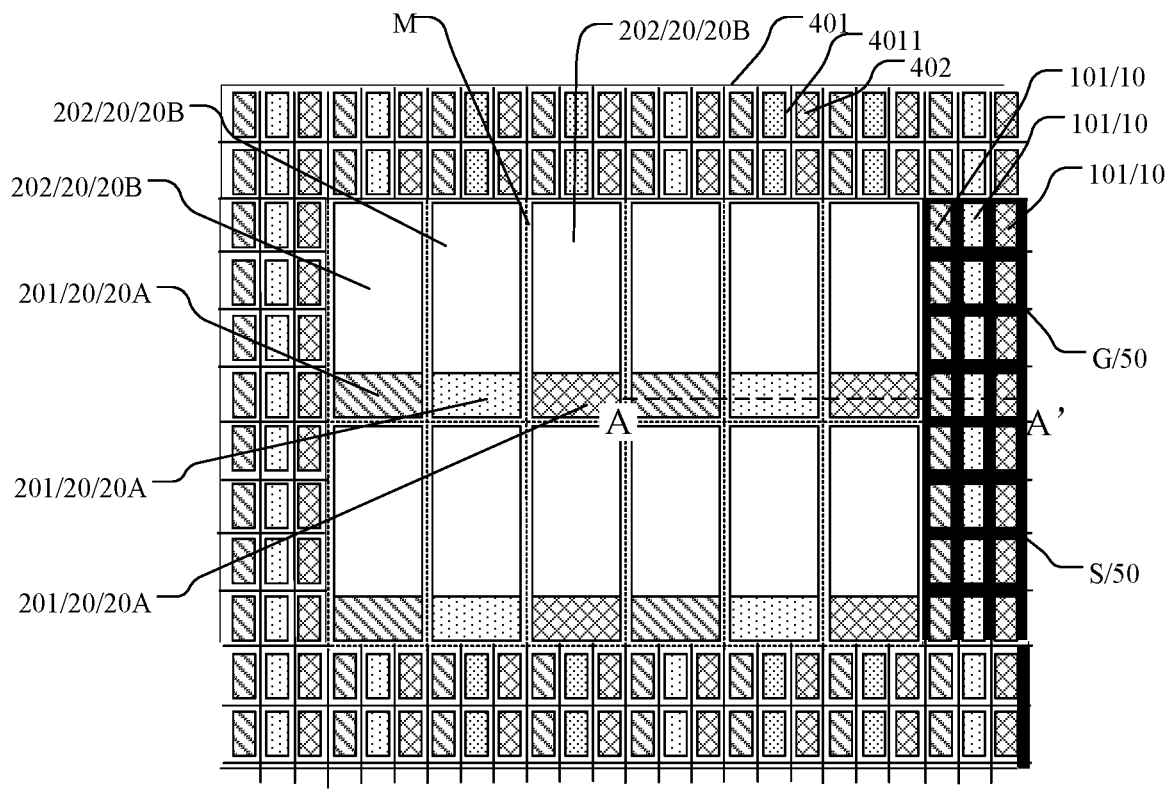
FIG. 3 illustrates a schematic local zoom-in view of another exemplary structure in FIG. 1 consistent with disclosed embodiments of the present disclosure.
Figure 4:
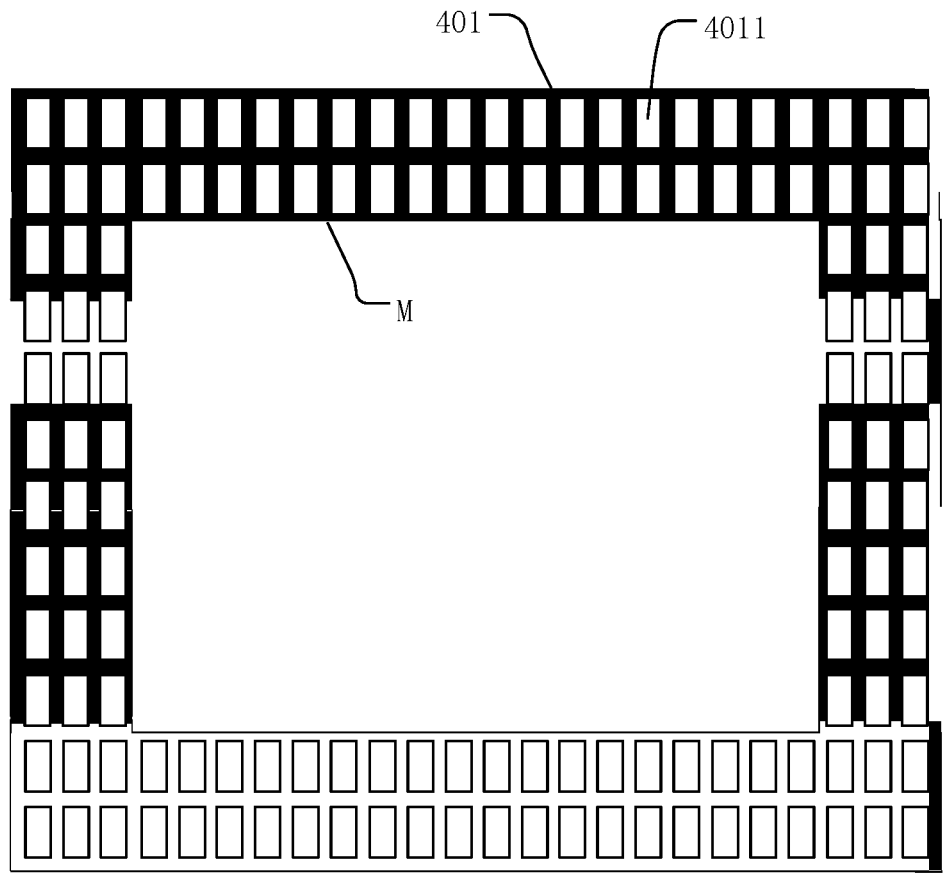
FIG. 4 illustrates a schematic structural diagram of an exemplary local black matrix layer consistent with disclosed embodiments of the present disclosure.
Figure 5:
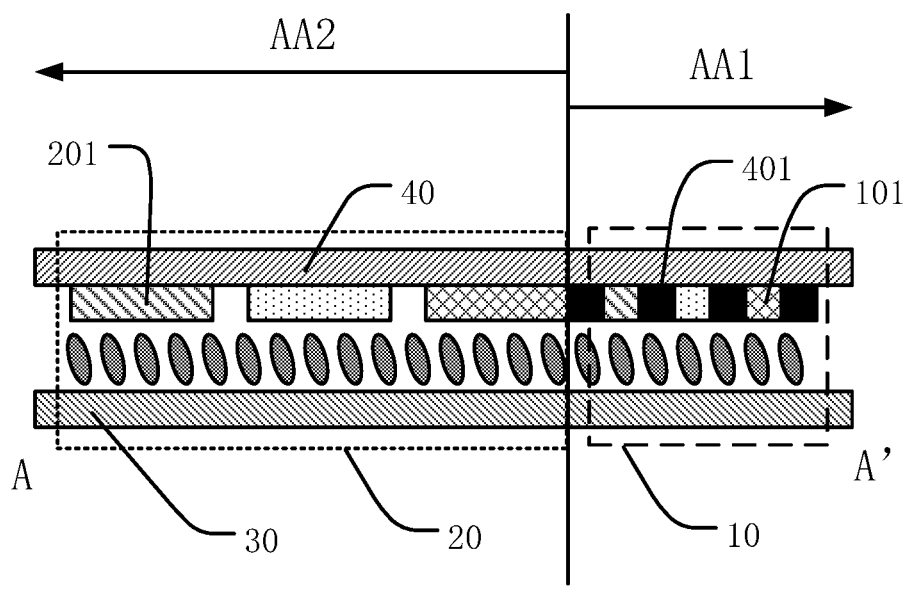
FIG. 5 illustrates a A-A' sectional view of an exemplary structure in FIG. 3 consistent with disclosed embodiments of the present disclosure.

FIG. 3 illustrates a schematic local zoom-in view of another structure in FIG. 1; FIG. 4 illustrates a schematic structural diagram of a local black matrix layer; and FIG. 5 illustrates a A-A' sectional view of the structure in FIG. 1. In certain embodiments, referring to FIG. 1, FIGS. 3-5, the first substrate 30 or the second substrate 40 may be further provided with a plurality of color resists 402 and a black matrix layer 401.

The black matrix layer 401 in the first display region AA1 may include a plurality of openings 4011, and the color resist 402 in the first display region AA1 may be located in the opening 4011.

The black matrix layer 401 in the second display region AA2 may include a hollow-out part M, such that at least one of the plurality of color resists 402 (e.g., one or more color resists) in the second display region AA2 may not be surrounded by the black matrix layer 401. For illustrative purposes, referring to FIG. 3, the black matrix layer 401 may not be disposed around the entire color resists 402 in the second display region AA2. Further, the orthographic projection of the hollow-out part M on the second substrate 40 may overlap the second display region AA2.

In the present disclosure, the display panel 000 may be a panel with a color filter on array (COA) structure. The COA technology may include that the first substrate 30 may be not only provided with a thin film transistor array and various signal lines, but also provided with a color filter structure (not illustrated) including the plurality of color resists 402 and the black matrix layer 401, which may increase the aperture ratio of the display panel and reduce the parasitic capacitance effect. Alternatively, the display panel 000 may have a structure where the first substrate 30 is the TFT substrate, and the second substrate 40 is the CF substrate. In other words, the second substrate 40 may be provided with the plurality of color resist 402 and the black matrix layer 401, which may not be limited by the present disclosure, and may be determined according to actual needs. For illustrative purposes, FIG. 5 illustrates a structure in which the first substrate 30 is a TFT substrate and the second substrate 40 is a CF substrate.

In the present disclosure, the black matrix layer 401 in the first display region AA1 may include the plurality of openings 4011, and the color resist 402 in the first display region AA1 may be disposed in the opening 4011. The black matrix layer 401 in the second display region AA2 may include the hollow-out part M, such that at least one of the plurality of color resists 402 in the second display region AA2 may not be surrounded by the black matrix layer 401. Further, the orthographic projection of the hollow-out part M on the second substrate 40 may overlap the second display region AA2. Therefore, the black matrix layer 401 may be disposed around the color resist 402 in the first display region AA2, while the black matrix layer 401 may not be disposed around at least one of the plurality of color resists 402 in the second display region AA2.

In the present disclosure, at least a portion of the black matrix layer 401 in the second display region AA2 (photosensitive element disposure region) may be cancelled, and the black matrix layer 401 in the first display region AA1 may be retained. The photosensitive element disposure region may still have the color resists 402 for normal display. Therefore, the first display region AA1 and the second display region AA2 together may achieve full-screen display, and at the same time, the shading of the black matrix layer 401 to the photosensitive element disposure region may be reduced, which may avoid affecting the photosensitive function, may facilitate to improve the photosensitive performance of the photosensitive element disposure region, and may improve the imaging quality of the photosensitive element in the photosensitive element disposure region.

FIG. 5 merely illustrates a schematic diagram of a partial cross-sectional structure of the display panel. In specific implementation, the film structure of the display panel may not be limited herein, and may include thin film transistor array film layer, various insulating layers, etc., which may refer to the film structure of the display panel in the related art, and may not be repeated herein.

Figure 6:
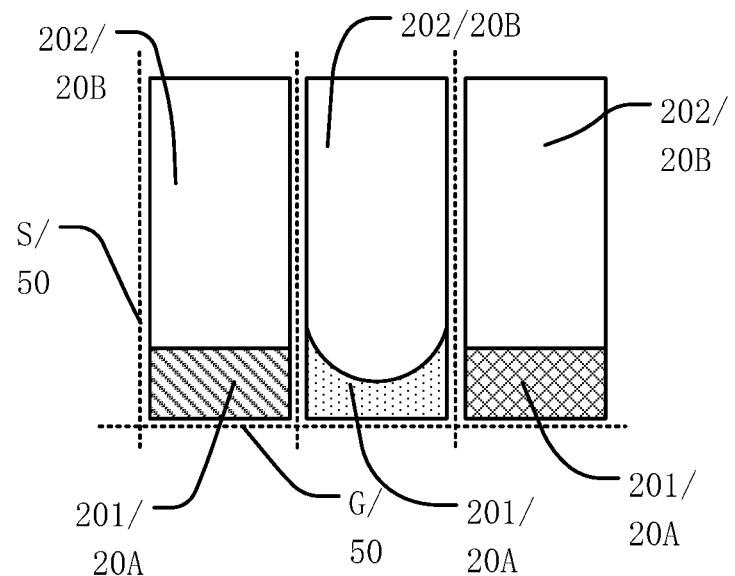
FIG. 6 illustrates a schematic local zoom-in view of another exemplary structure in FIG. 1 consistent with disclosed embodiments of the present disclosure.
Figure 7:
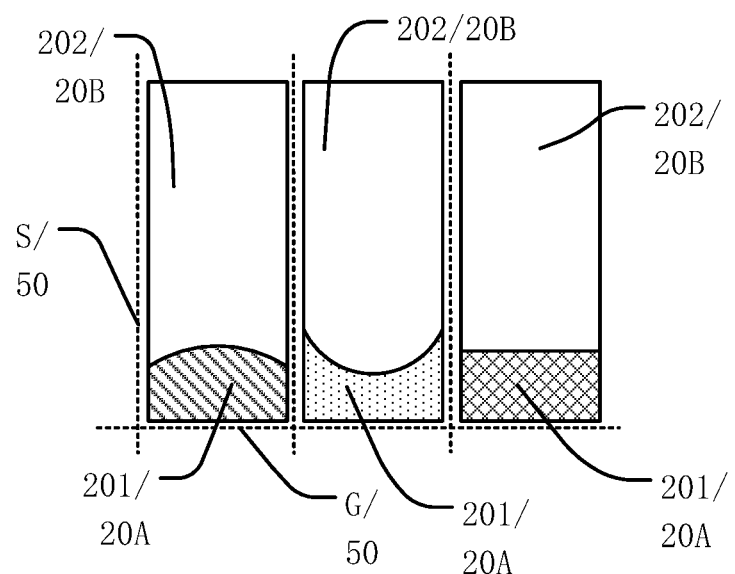
FIG. 7 illustrates a schematic local zoom-in view of another exemplary structure in FIG. 1 consistent with disclosed embodiments of the present disclosure.

FIG. 6 illustrates a schematic local zoom-in view of another structure in FIG. 1, and FIG. 7 illustrates a schematic local zoom-in view of another structure in FIG. 1. In certain embodiments, referring to FIG. 1, FIG. 6 and FIG. 7, in a same second pixel 20, the area of orthographic projections of the plurality of second sub-pixels 201 with different colors on the first substrate 30 may be the same, and the orthographic projection of at least one second sub-pixel 201 on the first substrate 30 may have a shape different from the orthographic projection of any other second sub-pixel 201 on the first substrate 30.

In the first region 20A of the same second pixel 20 in the second display region AA2, the orthographic projection of at least one second sub-pixel 201 on the first substrate 30 may have a shape different from the orthographic projection of any other second sub-pixel 201 on the first substrate 30. FIG. 6 may illustrate that the second pixel 20 may include three second sub-pixels 201 with different colors. Therefore, the grating formed by regularized second sub-pixel 201 pattern may not appear in the second display region AA2 multiplexed as the photosensitive element dispusre region, which may be prevented from affecting the imaging quality of the photosensitive element in the photosensitive element dispusre region.

Moreover, in the present disclosure, in the first region 20A of a same second pixel 20, although the orthographic projection of at least one second sub-pixel 201 on the first substrate 30 has a shape different from the orthographic projection of any other second sub-pixel 201 on the first substrate 30, the orthographic projections of the plurality of second sub-pixels 201 with different colors on the first substrate 30 may have a same area, which may facilitate to improve the uniformity of the display image when the second display region AA2 is used as a display region.

FIG. 6 merely illustrates that among the three second sub-pixels 201 with different colors in the first region 20A of the same second pixel 20, the orthographic projection of one second sub-pixel 201 on the first substrate 30 may have a shape different from the orthographic projections of the other two second sub-pixels 201 on the first substrate 30, while which may not be limited herein. In certain embodiments, referring to FIG. 7, the shapes of the orthographic projections of the three second sub-pixels 201 with different colors in the first region 20A of the same second pixel 20 on the first substrate 30 may be different, which may be determined according to practical applications. Optionally, the difference in the shape and area of the orthographic projections of the second sub-pixels 201 on the first substrate 30 may be achieved by setting the color resists with different shape and area.

FIG. 6 and FIG. 7 merely schematically illustrate the shapes of the orthographic projections of the plurality of second sub-pixels 201 with different colors in the first region 20A of the same second pixel 20 on the first substrate 30, which may not be limited herein. In practical applications, the shape of the orthographic projection of the second sub-pixel 201 on the first substrate 30 may be a regular pattern (e.g., a square, a strip, a trapezoid, a triangle, etc.), or an irregular pattern with irregular boundaries, which may not be limited herein.

Figure 8:
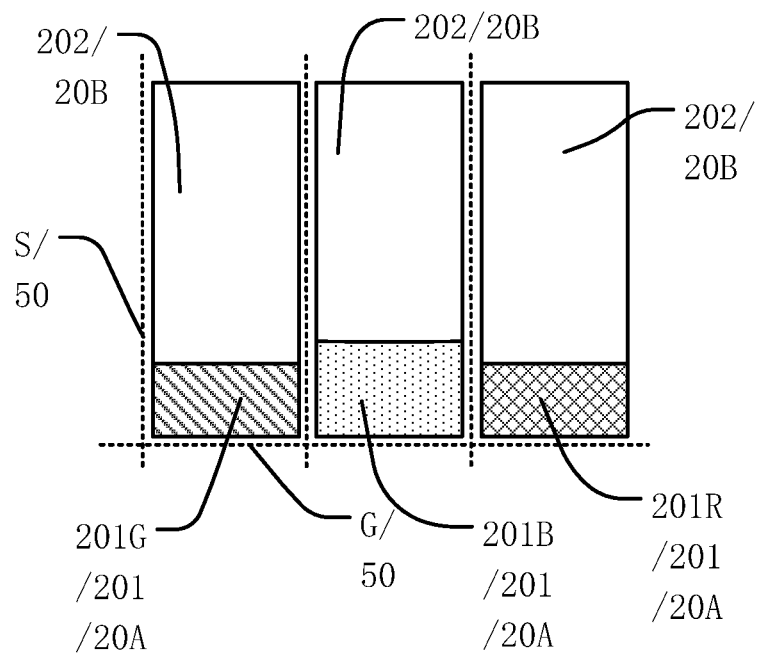
FIG. 8 illustrates a schematic local zoom-in view of another exemplary structure in FIG. 1 consistent with disclosed embodiments of the present disclosure.
Figure 9:
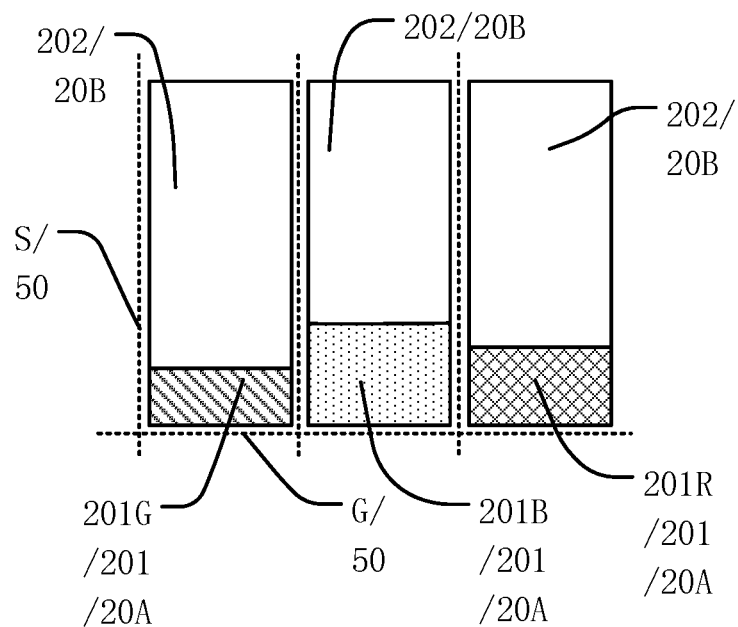
FIG. 9 illustrates a schematic local zoom-in view of another exemplary structure in FIG. 1 consistent with disclosed embodiments of the present disclosure.

FIG. 8 illustrates a schematic local zoom-in view of another structure in FIG. 1, and FIG. 9 illustrates a schematic local zoom-in view of another structure in FIG. 1. In certain embodiments, referring to FIG. 1, FIG. 8 and FIG. 9, in a same second pixel 20, the orthographic projections of the plurality of second sub-pixels 201 with different colors on the first substrate 30 may have a same shape, and the orthographic projection of at least one second sub-pixel 201 on the first substrate 30 may have an area different from the orthographic projection of any other second sub-pixel 201 on the first substrate 30.

In the first region 20A of the same second pixel 20 in the second display region AA2, the orthographic projections of the plurality of second sub-pixels 201 with different colors on the first substrate 30 may have a same shape, and the orthographic projection of at least one second sub-pixel 201 on the first substrate 30 may have an area different from the orthographic projection of any other second sub-pixel 201 on the first substrate 30. FIG. 8 may illustrate that the second pixel 20 may include three second sub-pixels 201 with different colors. Therefore, the grating formed by regularized second sub-pixel 201 pattern may not appear in the second display region AA2 multiplexed as the photosensitive element dispusre region, which may facilitate to improve the imaging quality of the photosensitive element in the photosensitive element dispusre region.

FIG. 8 merely illustrates that among the three second sub-pixels 201 with different colors in the first region 20A of the same second pixel 20, the orthographic projection of one second sub-pixel 201 on the first substrate 30 may have an area different from the orthographic projections of the other two second sub-pixels 201 on the first substrate 30, while which may not be limited herein. In certain embodiments, referring to FIG. 9, the orthographic projections of the three second sub-pixels 201 with different colors in the first region 20A of the same second pixel 20 on the first substrate 30 may have different area, which may be determined according to practical applications.

FIG. 8 and FIG. 9 merely schematically illustrate that the shapes of the orthographic projections of the plurality of second sub-pixels 201 with different colors in the first region 20A of the same second pixel 20 on the first substrate 30 may be a rectangle, which may not be limited herein. In practical applications, the shape of the orthographic projection of the second sub-pixel 201 on the first substrate 30 may be any other regular pattern (e.g., a square, a circle, a polygon, an ellipse, a trapezoid, a triangle, etc.), or an irregular pattern with irregular boundaries, which may not be limited herein.

Figure 10:
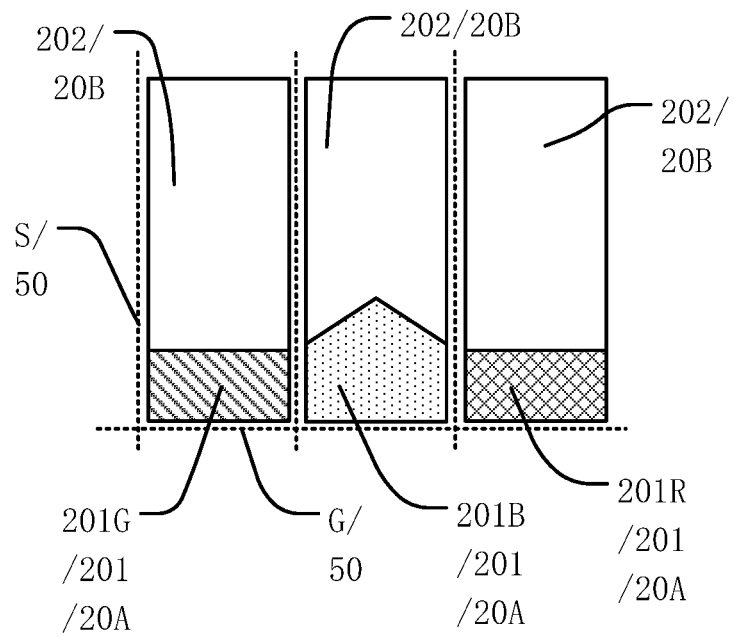
FIG. 10 illustrates a schematic local zoom-in view of another exemplary structure in FIG. 1 consistent with disclosed embodiments of the present disclosure.
Figure 11:
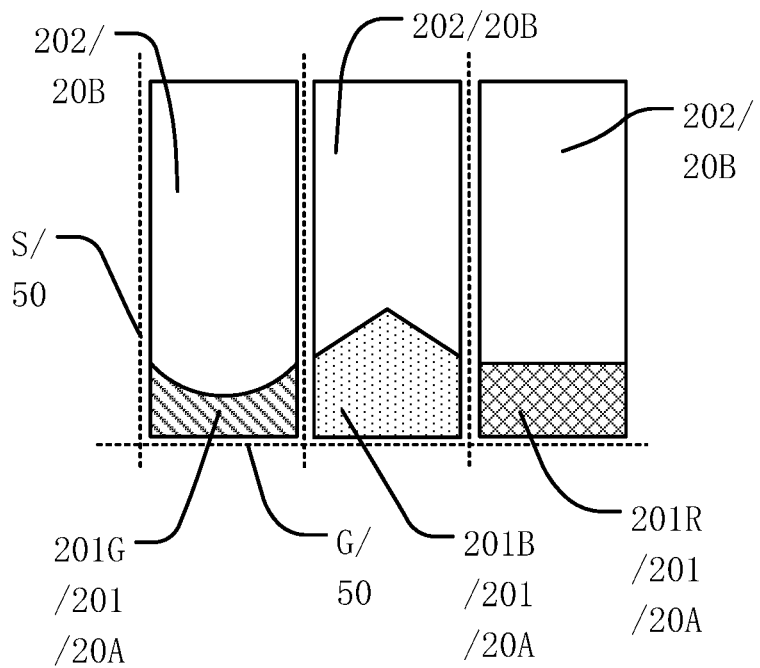
FIG. 11 illustrates a schematic local zoom-in view of another exemplary structure in FIG. 1 consistent with disclosed embodiments of the present disclosure.

FIG. 10 illustrates a schematic local zoom-in view of another structure in FIG. 1, and FIG. 11 illustrates a schematic local zoom-in view of another structure in FIG. 1. In certain embodiments, referring to FIG. 1, FIG. 10 and FIG. 11, in a same second pixel 20, the orthographic projection of at least one second sub-pixel 201 on the first substrate 30 may have a shape different from the orthographic projection of any other second sub-pixel 201 on the first substrate 30, and the orthographic projection of at least one second sub-pixel 201 on the first substrate 30 may have an area different from the orthographic projection of any other second sub-pixel 201 on the first substrate 30.

In the first region 20A of the same second pixel 20 in the second display region AA2, the orthographic projection of at least one second sub-pixel 201 on the first substrate 30 may have a shape different from the orthographic projection of any other second sub-pixel 201 on the first substrate 30, and the orthographic projection of at least one second sub-pixel 201 on the first substrate 30 may have an area different from the orthographic projection of any other second sub-pixel 201 on the first substrate 30. FIG. 10 and FIG. 11 may illustrate that the second pixel 20 may include three second sub-pixels 201 with different colors. Therefore, the grating formed by regularized second sub-pixel 201 pattern may not appear in the second display region AA2 multiplexed as the photosensitive element dispusre region, which may facilitate to improve the imaging quality of the photosensitive element in the photosensitive element dispusre region.

FIG. 10 merely illustrates that among the three second sub-pixels 201 with different colors in the first region 20A of the same second pixel 20, the orthographic projection of one second sub-pixel 201 on the first substrate 30 may have a shape different from the orthographic projections of the other two second sub-pixels 201 on the first substrate 30, and the orthographic projection of one second sub-pixel 201 on the first substrate 30 may have an area different from the orthographic projections of the other two second sub-pixels 201 on the first substrate 30, while which may not be limited herein. In certain embodiments, referring to FIG. 11, the orthographic projections of the three second sub-pixels 201 with different colors in the first region 20A of the same second pixel 20 on the first substrate 30 may have different shape and different area, which may be determined according to practical applications.

FIG. 10 and FIG. 11 merely schematically illustrate that the shapes of the orthographic projections of the plurality of second sub-pixels 201 with different colors in the first region 20A of the same second pixel 20 on the first substrate 30 may include a rectangle, which may not be limited herein. In practical applications, the shape of the orthographic projection of the second sub-pixel 201 on the first substrate 30 may be any other regular pattern (e.g., a square, a circle, a polygon, an ellipse, a trapezoid, a triangle, etc.), or an irregular pattern with irregular boundaries, which may not be limited herein.

In certain embodiments, referring to FIG. 1 and FIGS. 8-11, the same second pixel 20 may include three second sub-pixels 201 with different colors. The area ratio of the orthographic projections of the three second sub-pixels 201 with different colors on the first substrate 30 may be approximately 2:1:3. Optionally, the three second sub-pixels 201 with different colors in the same second pixel 20 may include a second red sub-pixel 201R, a second green sub-pixel 201G, and a second blue sub-pixel 201B, respectively. The area ratio of the orthographic projections of the second red sub-pixel 201R, the second green sub-pixel 201G, and the second blue sub-pixel 201B on the first substrate 30 may be less than or equal to 2:1:3. Optionally, the area ratio of the orthographic projections of the second red sub-pixel 201R, the second green sub-pixel 201G and the second blue sub-pixel 201B on the first substrate 30 may be greater than or equal to 1:1:1.

In the present disclosure, the three second sub-pixels 201 with different colors in the same second pixel 20 may include the second red sub-pixel 201R, the second green sub-pixel 201G, and the second blue sub-pixel 201B, respectively. When the photosensitive element in the photosensitive element disposure region (the second display region AA2) is not working, the first sub-pixel 101 and the second sub-pixel 201 may jointly work, and the second display region AA2 and the first display region AA1 may display an image together to achieve the full-screen display effect of the display panel 000.

In the present disclosure, the orthographic projections of the three second sub-pixels 201 with different colors in the same second pixel 20 on the first substrate 30 may have different shape and/or area. Therefore, the grating formed by regularized second sub-pixel 201 pattern may not appear in the second display region AA2 multiplexed as the photosensitive element disposure region, which may facilitate to improve the imaging quality of the photosensitive element in the photosensitive element disposure region. At the same time, the three second sub-pixels 201 with different colors in the same second pixel 20 may include the second red sub-pixel 201R, the second green sub-pixel 201G, and the second blue sub-pixel 201B, respectively. The area ratio of the orthographic projections of the second red sub-pixel 201R, the second green sub-pixel 201G, and the second blue sub-pixel 201B on the first substrate 30 may be denoted as (x:y:z), which may range from approximately (1:1:1) to (2:1:3). Therefore, when displaying an image, to achieve desired display quality, the photosensitive element disposure region (second display region AA2) and the first display region AA1 may display together to achieve a full-screen display effect.

Optionally, the light outputted from the plurality of third sub-pixels 202 in the second region 20B may have a white color. The plurality of first sub-pixels 101 with different colors of each first pixel 10 may include a first red sub-pixel, a first green sub-pixel, and a first blue sub-pixel (not illustrated). Therefore, while achieving the display function of the second display region AA2, the second region 20B may have a high transmittance to provide conditions for the operation of the photosensitive element in the photosensitive element disposure region, to achieve the full-screen display effect and to improve the imaging quality of the photosensitive element.

Figure 12:
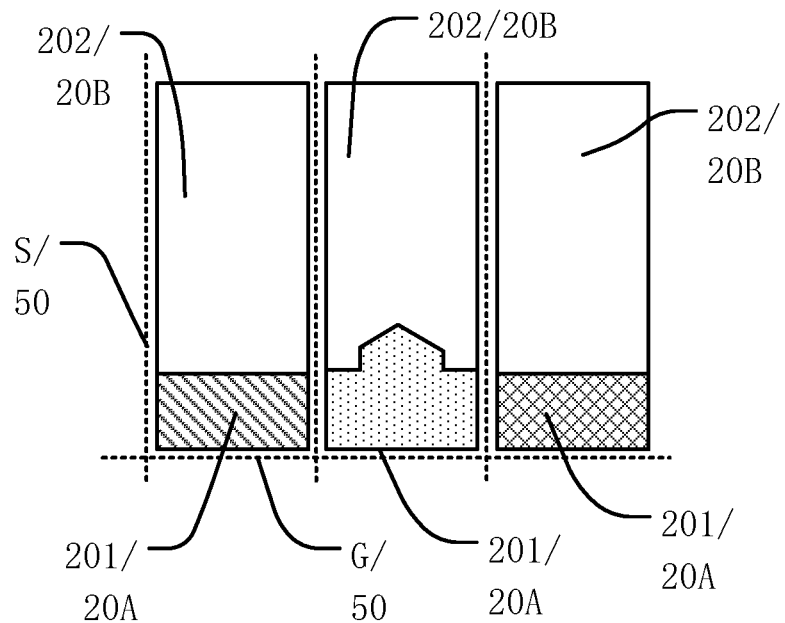
FIG. 12 illustrates a schematic local zoom-in view of another exemplary structure in FIG. 1 consistent with disclosed embodiments of the present disclosure.
Figure 13:
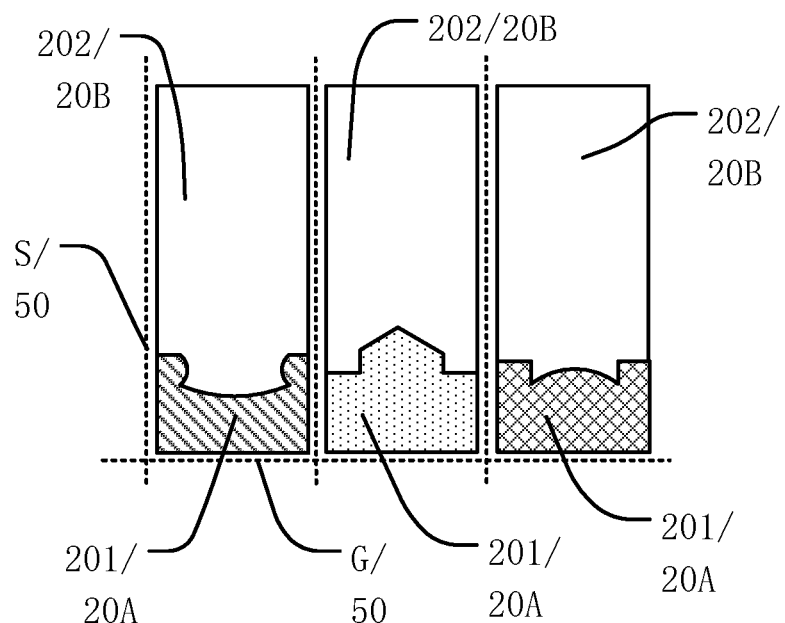
FIG. 13 illustrates a schematic local zoom-in view of another exemplary structure in FIG. 1 consistent with disclosed embodiments of the present disclosure.

FIG. 12 illustrates a schematic local zoom-in view of another structure in FIG. 1, and FIG. 13 illustrates a schematic local zoom-in view of another structure in FIG. 1. In certain embodiments, referring to FIG. 1, FIG. 12 and FIG. 13, in a same second pixel 20, the orthographic projection of at least one second sub-pixel 201 on the first substrate 30 may have an irregular pattern.

In the first region 20A of the same second pixel 20 in the second display region AA2, the orthographic projection of at least one second sub-pixel 201 on the first substrate 30 may have an irregular pattern with irregular boundaries, as shown in FIG. 12 and FIG. 13. For illustrative purposes, FIG. 12 illustrates that the orthographic projection of one second sub-pixel 201 on the first substrate 30 may have an irregular pattern, and the orthographic projections of the other second sub-pixels 201 on the first substrate 30 may have a regular pattern (rectangular). FIG. 12 and FIG. 13 may illustrate that the second pixel 20 may include three second sub-pixels 201 with different colors.

Therefore, no matter whether the area of the orthographic projections of the plurality of second sub-pixels 201 in the first region 20A of the second pixel 20 on the first substrate 30 is the same or not, through the at least one second sub-pixel 201 with irregular pattern, the grating formed by regularized second sub-pixel 201 pattern may not appear in the second display region AA2 multiplexed as the photosensitive element disposure region, which may facilitate to improve the imaging quality of the photosensitive element in the photosensitive element disposure region.

FIG. 12 merely illustrates that among the three second sub-pixels 201 with different colors in the first region 20A of the same second pixel 20, the orthographic projection of one second sub-pixel 201 on the first substrate 30 may have an irregular pattern, and the orthographic projections of the other two second sub-pixels 201 on the first substrate 30 may have a regular pattern, which may not be limited herein. In certain embodiments, referring to FIG. 13, the orthographic projections of the three second sub-pixels 201 with different colors in the first region 20A of the same second pixel 20 on the first substrate 30 each may have an irregular pattern, which may be determined according to practical applications.

Figure 14:
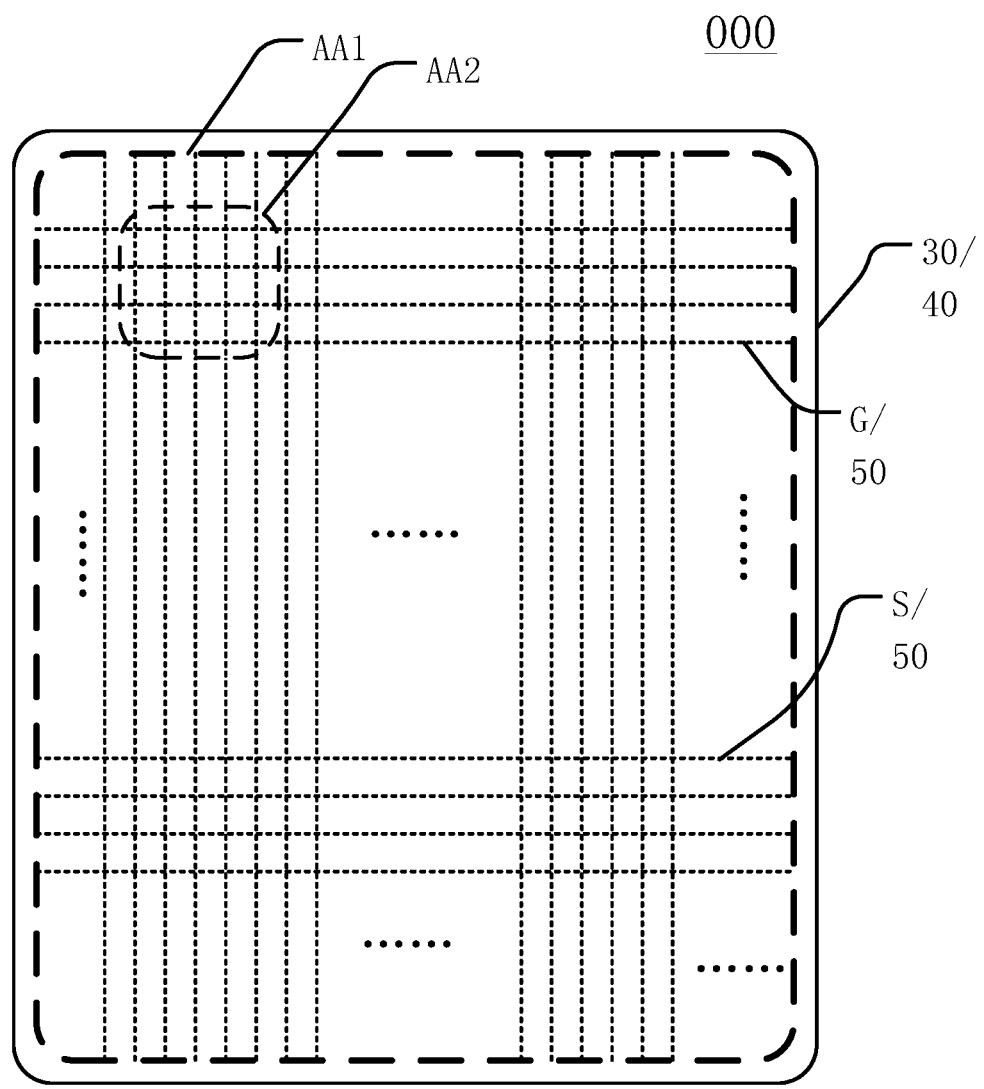
FIG. 14 illustrates a schematic top-view of another exemplary display panel consistent with disclosed embodiments of the present disclosure.
Figure 15:
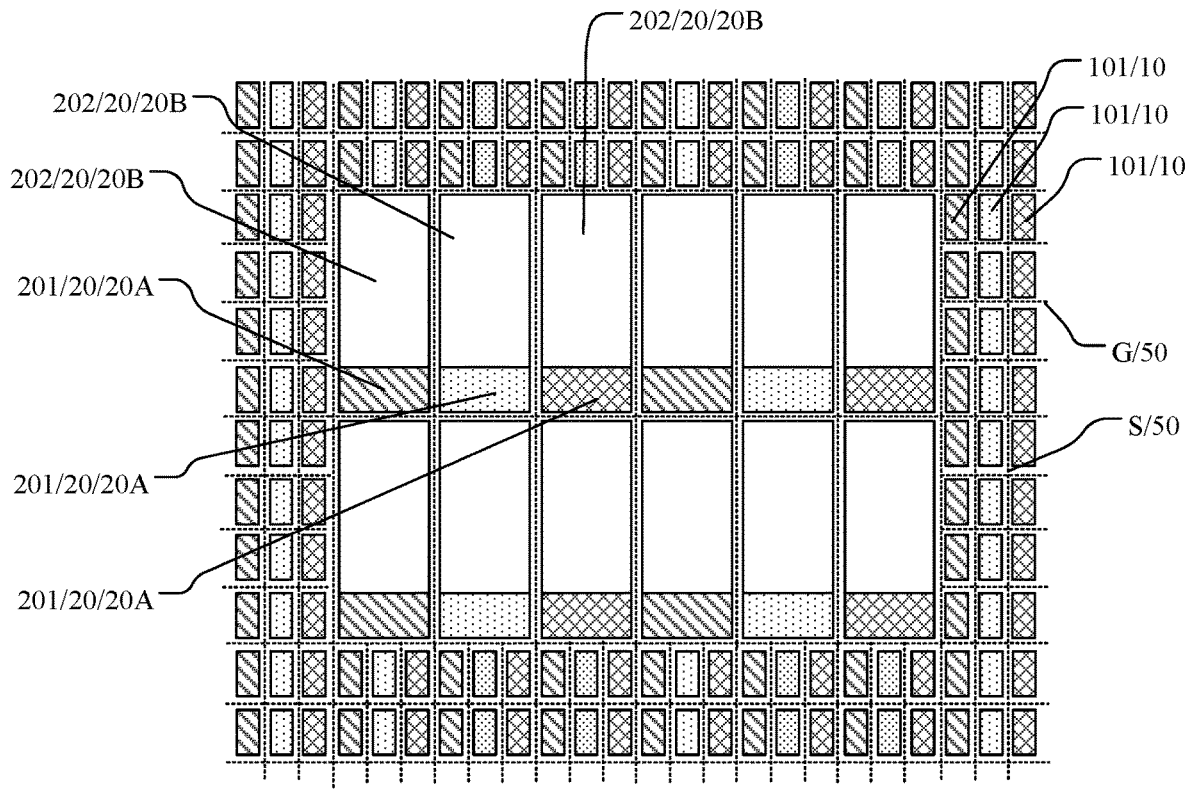
FIG. 15 illustrates a schematic local zoom-in view of an exemplary structure in FIG. 14 consistent with disclosed embodiments of the present disclosure.

FIG. 14 illustrates a schematic top-view of another display panel consistent with disclosed embodiments of the present disclosure; and FIG. 15 illustrates a schematic local zoom-in view of a structure in FIG. 14. In certain embodiments, referring to FIG. 14 and FIG. 15, the signal line 50 in the first display region AA1 and the signal line 50 in the second display region AA2 may be made of a same material.

In the present disclosure, the first substrate 30 of the display panel 000 may be provided with a plurality of signal lines 50. The signal lines 50 may include a scan line G, a data line S, and any other signal line capable of transmitting display driving signal, which may not be limited herein.

For illustrative purposes, the first substrate 30 may be an array substrate as an example. In a specific implementation, the first substrate 30 may be an array substrate including a plurality of color resists and a black matrix layer, which may not be limited herein. The scan lines G and data lines S may be isolated and crossed to define regions where the first sub-pixel 101, the second sub-pixel 201, and the third sub-pixel 202 are located.

As disclosed, the signal line 50 in the second display region AA2 is made of an exemplary transparent conductive material. In contrast, when the signal line was made of a non-transparent material, a regular array pattern may be formed in the second display region AA2 of the display panel 000, and a grating may then be formed. By using the disclosed transparent conductive material for the signal line 50, when the second display region AA2 is multiplexed as a photosensitive element disposure region, the diffraction and interference phenomenon of the grating under the action of light upon operation of the photosensitive element may be prevented or reduced, thereby facilitating to increase the screen-to-body ratio, and to improve the use effect of the photosensitive element (such as the camera) while improving the display effect of the full-screen.

Further, in the present disclosure, the signal line 50 in the first display region AA1 and the signal line 50 in the second display region AA2 may be made of a same material. In other words, the signal lines 50 in both the first display region AA1 and the second display region AA2 may be made of the transparent conductive material (the dashed lines in FIG. 14 and FIG. 15 represent the transparent conductive material). Therefore, in the manufacturing process, various signal lines 50 of the display panel 000 may be manufactured in a same process, which may facilitate to improve the process efficiency and to reduce the process difficulty.

Figure 16:
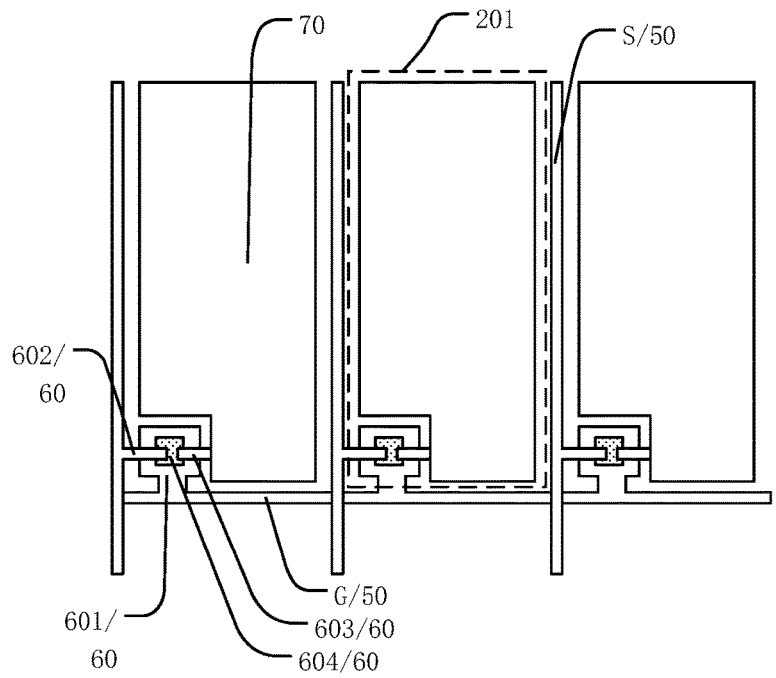
FIG. 16 illustrates a schematic local zoom-in top-view of an exemplary second display region in FIG. 2 and FIG. 15 consistent with disclosed embodiments of the present disclosure.

FIG. 16 illustrates a schematic local zoom-in top-view of a second display region in FIG. 2 and FIG. 15. In certain embodiments, referring to FIGS. 1-3 and FIGS. 14-16, the second sub-pixel 201 may include a thin film transistor 60 and a pixel electrode 70 that are electrically connected to each other. The thin film transistor 60 may include a gate electrode 601, a source electrode 602, a drain electrode 603, and an active part 604. The gate electrode 601 may be electrically connected to the scan line G. One end of the source electrode 602 may be electrically connected to the data line S, and the other end of the source electrode 602 may be electrically connected to the active part 604. One end of the drain electrode 603 may be electrically connected to the pixel electrode 70, and the other end of the drain electrode 603 may be electrically connected to the active part 604. The gate electrode 601 may be disposed in a same layer as the scan line G, and the source electrode 602 and the drain electrode 603 may be disposed in a same layer as the data line S.

In the present disclosure, the display panel 000 may be a liquid crystal display panel, and may include a first substrate 30 and a second substrate 40 that are arranged opposite to each other. For illustrative purposes, the first substrate 30 may be an array substrate as an example. The first substrate 30 may be configured to form a thin film transistor array, a scan line, a data line, and a common electrode and/or a pixel electrode, etc. Optionally, in the second display region AA2, the second sub-pixel 201 may include a thin film transistor 60 and a pixel electrode 70 that are electrically connected to each other.

The thin film transistor 60 may include a gate electrode 601, a source electrode 602, a drain electrode 603, and an active part 604. The gate electrode 601 may be electrically connected to the scan line G. One end of the source electrode 602 may be electrically connected to the data line S, and the other end of the source electrode 602 may be electrically connected to the active part 604. One end of the drain electrode 603 may be electrically connected to the pixel electrode 70, and the other end of the drain electrode 603 may be electrically connected to the active part 604.

The thin film transistor 60 may serve as a switching device of the second sub-pixel 201 in the display panel 000. The gate electrode 601 of thin film transistor 60 may be connected to the scan line G of the display panel 000, and may be connected to a gate scan driving circuit (not illustrated) through the scan line G. The source electrode 602 of the thin film transistor 60 may be connected to the data line S, and may be connected to an integrated driving circuit (IC) through the data line S. The drain electrode 603 of the thin film transistor 60 may be connected to the pixel electrode 70, and may apply a voltage to the pixel electrode 70 through the data line S. Therefore, an electric field may be formed between the pixel electrode 70 and the common electrode (not illustrated). The liquid crystal molecules in the liquid crystal layer between the first substrate 30 and the second substrate 40 may be deflected in the electric field, and may control light to emit, thereby achieving the display of the display panel 000.

The gate electrode 601 of the thin film transistor 60 may be disposed in the same layer and made of a same material as the scan line G. The same filling pattern in FIG. 16 may illustrate same layer and same material arrangement, and the non-filling pattern may indicate the transparent conductive material. The source electrode 602 and drain electrode 603 of the thin film transistor 60 may be disposed in a same layer and made of a same material (transparent conductive material) as the data line S, which may facilitate to improve the process efficiency, and at the same time, may increase the transmittance of the second display region AA2. The thin film transistor 60 may be prevented from affecting the imaging quality when the second display region AA2 is used as the photosensitive element disposure region.

FIG. 16 merely illustrates a schematic diagram of a top-view of the second sub-pixel 201 of the display panel 000. The cross-sectional structure of the display panel may be understood with reference to the film structure of the liquid crystal display panel in the related art, which may not be repeated herein.

Figure 17:
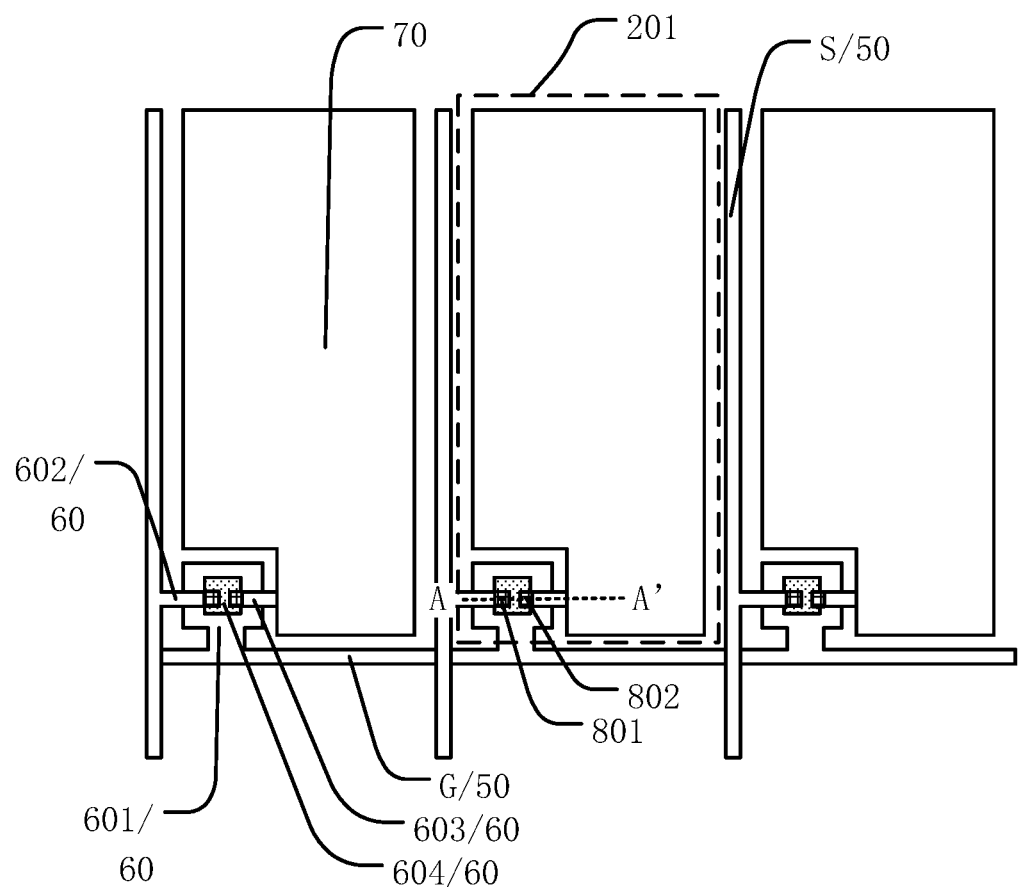
FIG. 17 illustrates a schematic local zoom-in top-view of another exemplary second display region in FIG. 2 and FIG. 15 consistent with disclosed embodiments of the present disclosure.
Figure 18:
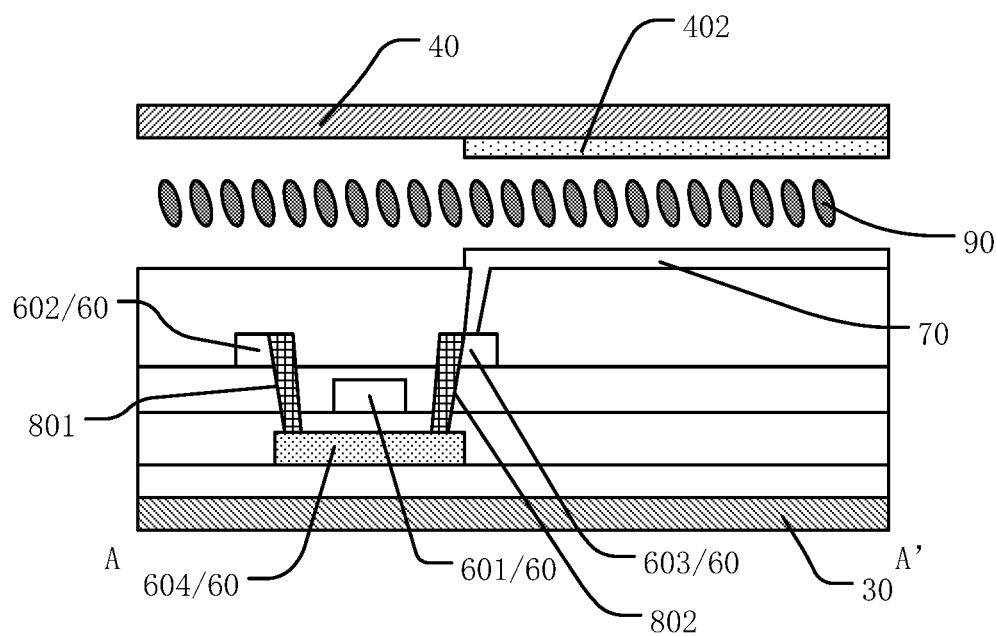
FIG. 18 illustrates a A-A' sectional view of an exemplary structure in FIG. 17 consistent with disclosed embodiments of the present disclosure.

FIG. 17 illustrates a schematic local zoom-in top-view of a second display region in FIG. 2 and FIG. 15, and FIG. 18 illustrates a A-A' sectional view of a structure in FIG. 17. For illustrative purposes, FIG. 18 illustrates the thin film transistor 60 having a top gate structure as an example. In specific implementation, the thin film transistor 60 may have a bottom gate structure, which may not be limited by the present disclosure.

In certain embodiments, referring to FIGS. 1-3, FIGS. 14-15 and FIGS. 17-18, the source electrode 602 of the thin film transistor 60 may be electrically connected to the active part 604 through a first via 801, and the drain electrode 603 may be electrically connected to the active part 604 through a second via 802. The source electrode 602 at the position of the first via 801 and the drain electrode 603 at the position of the second via 802 may be made of a non-transparent conductive material. The non-filling pattern in FIGS. 17-18 illustrates the transparent conductive material. Optionally, a liquid crystal layer 90 may be disposed between the first substrate 30 and the second substrate 40. The second substrate 40 may include a plurality of color resists 402 with different colors, and the shape of each second sub-pixel 201 may be determined according to the shape of the color resist 402.

In the display panel 000, the source electrode 602 and the drain electrode 603 of the thin film transistor 60 may be electrically connected to the active part 604, respectively, to ensure the source electrode 602 and the drain electrode 603 to be conducted when the thin film transistor 60 is in a turned-on state. The source electrode 602 and drain electrode 603 may be located in a film layer different from the active part 604, and an insulating layer may also be disposed between the film layer where the source electrode 602 and the drain electrode 603 are located and the film layer where the active part 604 is located. In practical applications, via connecting the active part 604 and the source electrode 602 as well as the drain electrode 603 may be formed in the insulating layer. Therefore, the source electrode 602 of the thin film transistor 60 may be electrically connected to the active part 604 through the first via 801, and the drain electrode 603 may be electrically connected to the active part 604 through the second via 802.

The source electrode 602 at the position of the first via 801 and the drain electrode 603 at the position of the second via 802 may be made of a non-transparent conductive material. The gate electrode 601 may be formed in a same layer and made of a same material (transparent conductive material) as the scan line G. The source electrode 602 and drain electrode 603 may be disposed in a same layer and made of a same material (transparent conductive material) as the data line S, which may increase the transmittance of the second display region AA2. Therefore, the thin film transistor 60 may be prevented from affecting the imaging quality when the second display region AA2 is used as the photosensitive element disposure region.

Further, the source electrode 602 at the position of the first via 801 and drain electrode 603 at the position of the second via 802 may be made of non-transparent conductive material, which may improve the conductivity of the source electrode 602, the drain electrode 603 and the active part 604, and may be prevented from affecting the performance of the thin film transistor 60 when connecting the source electrode 602, the drain electrode 603 and the active part 604 by a transparent conductive material.

During the manufacturing process, the non-transparent conductive material may be first deposited or evaporated through a mask at the positions of the first via 801 and the second via 802 of the insulating layer above the active part 604, and then the source electrode 602 and the drain electrode 603 made of the transparent conductive material may be formed, which may not be limited herein. As long as the source electrode 602 and the drain electrode 603 are made of a non-transparent conductive material at the positions of the first via 801 and the second via 802 and made of transparent conductive material at any other position, any other process may be used, which may not be limited herein.

FIG. 17 merely illustrates a schematic diagram of a planar structure of the thin film transistor 60, where the shapes of the gate electrode 601, the source electrode 602, the drain electrode 603, and the active part 604 may be merely used as an example. In practical applications, the thin film transistor 60 may have any other shape, for example, the active part 604 may have a U-shaped structure, etc. (not illustrated), which may not be limited herein. Optionally, the active part 604 may be made of low-temperature polysilicon material. The low-temperature polysilicon material may have a substantially fast electron mobility, and the area of the formed thin film transistor array may be substantially small, which may lower the power consumption of the circuit and reduce the power consumption of the display panel. In addition, the substantially small thin film transistor array may make the entire display panel have a substantially high aperture ratio.

Figure 19:
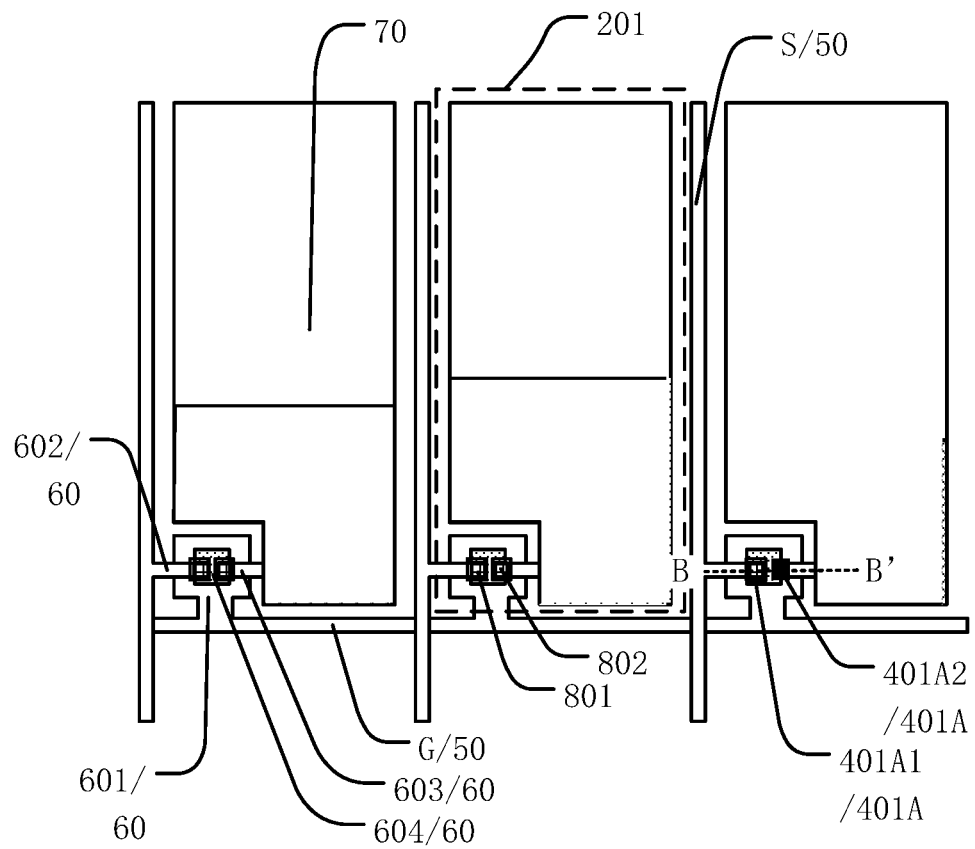
FIG. 19 illustrates a schematic local zoom-in top-view of another exemplary second display region in FIG. 2 and FIG. 15 consistent with disclosed embodiments of the present disclosure.
Figure 20:
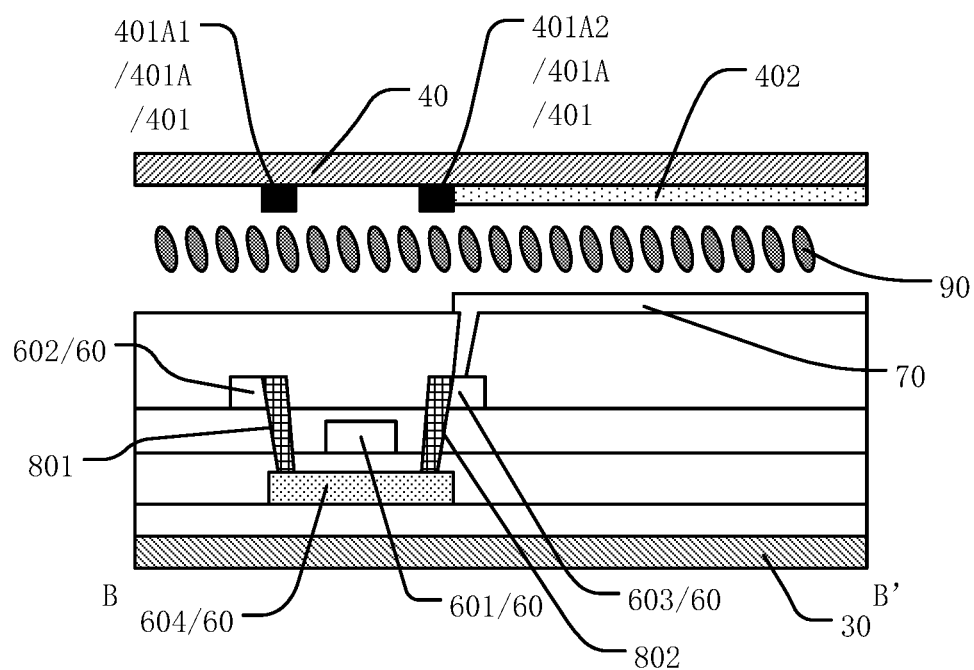
FIG. 20 illustrates a B-B' sectional view of an exemplary structure in FIG. 19 consistent with disclosed embodiments of the present disclosure.

FIG. 19 illustrates a schematic local zoom-in top-view of another second display region in FIG. 2 and FIG. 15, and FIG. 20 illustrates a B-B' sectional view of a structure in FIG. 19. To clearly illustrate the structure of the first shielding element 401A, FIG. 19 illustrates transparency filling. For illustrative purposes, FIG. 20 illustrates the thin film transistor 60 having a top gate structure as an example. In specific implementation, the thin film transistor 60 may have a bottom gate structure, which may not be limited herein.

In certain embodiments, the second substrate 40 in the second display region AA2 may be further provided with a first shielding element 401A. The first shielding element 401A may include a plurality of first sub-elements 401A1 and a plurality of second sub-elements 401A2. The orthographic projection of the first sub-element 401A1 on the first substrate 30 may cover the orthographic projection of the first via 801 on the first substrate 30. The orthographic projection of the second sub-element 401A2 on the first substrate 30 may cover the orthographic projection of the second via 802 on the first substrate 30.

The source electrode 602 at the position of the first via 801 and the drain electrode 603 at the position of the second via 802 may be made of non-transparent conductive material, to improve the conductivity of the source electrode 602, the drain electrode 603 and the active part 604, which may be prevented from affecting the performance of the thin film transistor 60 when connecting the source electrode 602, the drain electrode 603 and the active part 604 by a transparent conductive material. The non-transparent conductive material may often include a metal conductive material with light reflection.

The second substrate 40 in the second display region AA2 may be further provided with the first shielding element 401A. The first shielding element 401A may include the plurality of first sub-elements 401A1 and the plurality of second sub-elements 401A2. The orthographic projection of the first sub-element 401A1 on the first substrate 30 may cover the orthographic projection of the first via 801 on the first substrate 30. The orthographic projection of the second sub-element 401A2 on the first substrate 30 may cover the orthographic projection of the second via 802 on the first substrate 30.

The source electrode 602 and drain electrode 603 made of the non-transparent conductive material at the positions of the first via 801 and the second via 802 may be shielded by the first sub-element 401A1 and the second sub-element 401A2, to prevent light leakage at the first via 801 and the second via 802, which may be prevented from affecting optical quality and the display effect of the display panel 000. At the same time, grating, formed by the regular array pattern of the source electrode 602 and drain electrode 603 made of the non-transparent conductive material in the second display region AA2 of the display panel 000, may be prevented from being formed. When the photosensitive element is working, the diffraction and interference phenomenon of the grating under the action of light may be prevented, thereby facilitating to increase the screen-to-body ratio, to improve the display effect of the full-screen, and to improve the use effect of the photosensitive element such as the camera.

Optionally, according to the shapes of the orthographic projections of the first via 801 and the second via 802 on the first substrate 30, the first sub-element 401A1 and the second sub-element 401A2 may be designed in different shapes, such as a circle (not illustrated), a square (shown in FIG. 19), or a polygon (not illustrated), to shield the non-transparent conductive material.

The first shielding element 401A may be made of a shading material, and may be formed in a same layer and made of a same material as the black matrix layer 401 over the second substrate 40. When the display panel is a panel with a COA structure (black matrix layer 401 and the color resist 402 may be formed over the first substrate 30 on a same side of the thin film transistor 60), the first shielding element 401A may be formed on the first substrate 30, which may be determined according to actual requirements.

In certain embodiments, referring to FIGS. 1-3, FIGS. 14-15 and FIGS. 19-20, the orthographic projection of the first sub-element 401A1 on the first substrate 30 may have an area greater than the orthographic projection of the first via 801 on the first substrate 30, and the orthographic projection of the second sub-element 401A2 on the first substrate 30 may have an area greater than the orthographic projection of the second via 802 on the first substrate 30.

In the present disclosure, the first shielding element 401A for shielding the source electrode 602 and the drain electrode 603 made of the non-transparent conductive material at the positions of the first via 801 and the second via 802 may be set to be as wide as possible. In other words, the orthographic projection of the first sub-element 401A1 on the first substrate 30 may have an area greater than the orthographic projection of the first via 801 on the first substrate 30, and the orthographic projection of the second sub-element 401A2 on the first substrate 30 may have an area greater than the orthographic projection of the second via 802 on the first substrate, to effectively shield the reflection of the non-transparent conductive material, to effectively prevent the light leakage at the first via 801 and the second via 802, and to be further prevented from affecting optical quality and the display effect of the display panel 000.

Figure 21:
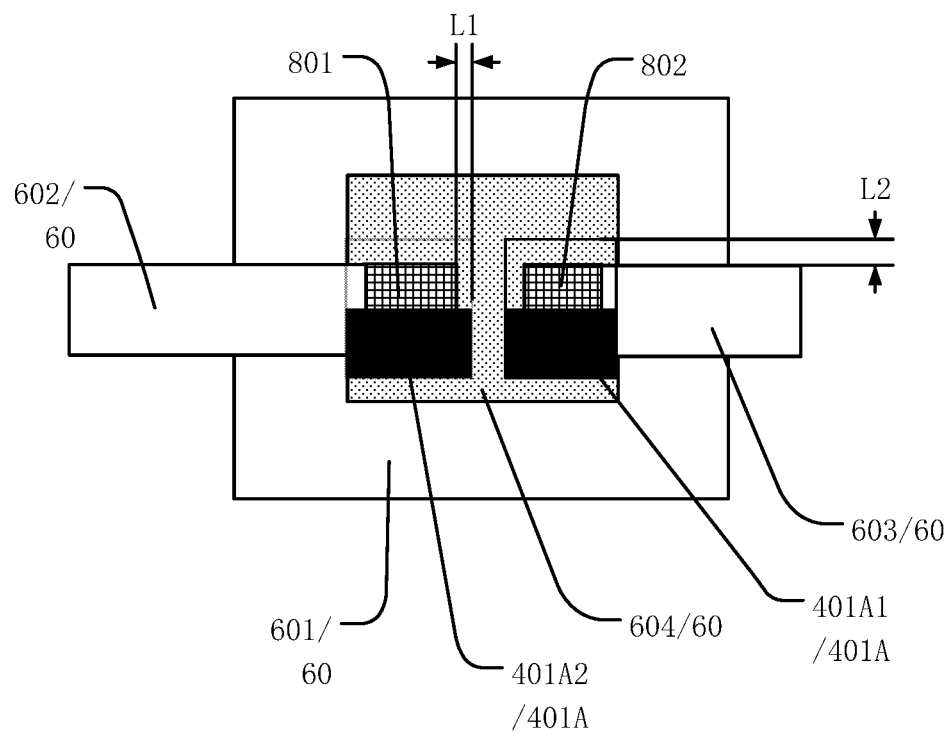
FIG. 21 illustrates a local zoom-in view of an exemplary thin-film transistor region in FIG. 19 consistent with disclosed embodiments of the present disclosure.

FIG. 21 illustrates a local zoom-in view of a thin-film transistor region in FIG. 19. In certain embodiments, referring to FIGS. 1-3, FIGS. 14-15 and FIGS. 19-21, in a same second sub-pixel 201, the orthographic projection of the first sub-element 401A1 on the first substrate 30 may be a first projection, and the orthographic projection of the first via 801 on the first substrate 30 may be a second projection. The distance L1 between boundary of the first projection and the boundary of the second projection may be less than or equal to 1 In a same second sub-pixel 201, the orthographic projection of the second sub-element 401A2 on the first substrate 30 may be a third projection, and the orthographic projection of the second via 802 on the first substrate 30 may be a fourth projection. The distance L2 between the boundary of the third projection and the boundary of the fourth projection may be less than or equal to 1 μm.

In the present disclosure, the first shielding element 401A for shielding the source electrode 602 and the drain electrode 603 made of the non-transparent conductive material at the positions of the first via 801 and the second via 802 may be set to be as wide as possible. In other words, the orthographic projection of the first sub-element 401A1 on the first substrate 30 may have an area greater than the orthographic projection of the first via 801 on the first substrate 30, and the orthographic projection of the second sub-element 401A2 on the first substrate 30 may have an area greater than the orthographic projection of the second via 802 on the first substrate, to effectively shield the reflection of the non-transparent conductive material, to effectively prevent the light leakage at the first via 801 and the second via 802, and to be further prevented from affecting optical quality and the display effect of the display panel 000.

Further, the first shielding element 401A may be prevented from over-expansion. In a same second sub-pixel 201, the orthographic projection of the first sub-element 401A1 on the first substrate 30 may be a first projection, and the orthographic projection of the first via 801 on the first substrate 30 may be a second projection. The distance L1 between boundary of the first projection and the boundary of the second projection may be less than or equal to 1 In a same second sub-pixel 201, the orthographic projection of the second sub-element 401A2 on the first substrate 30 may be a third projection, and the orthographic projection of the second via 802 on the first substrate 30 may be a fourth projection. The distance L2 between the boundary of the third projection and the boundary of the fourth projection may be less than or equal to 1 Therefore, the first shielding element 401A may be prevented from occupying too much area of the second display region AA2 while effectively preventing the reflection of the non-transparent conductive material and light leakage, and, thus, the transmittance of the second display region AA2 may not be affected, and the imaging quality of the photosensitive element may not be affected.

Figure 22:
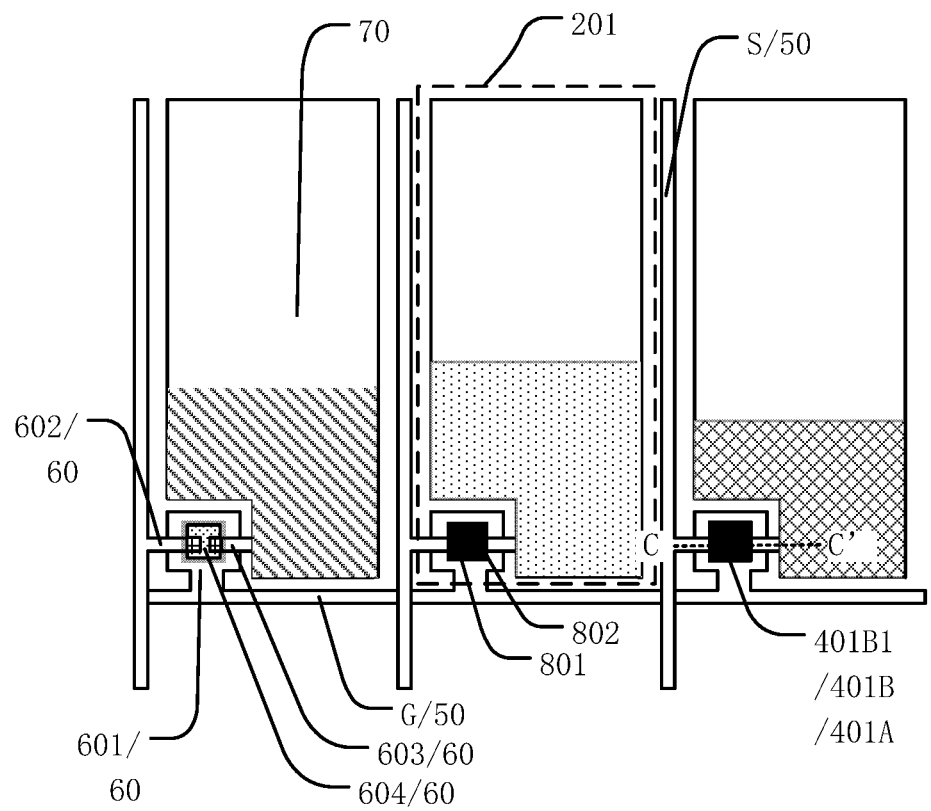
FIG. 22 illustrates a schematic local zoom-in top-view of another exemplary second display region in FIG. 2 and FIG. 15 consistent with disclosed embodiments of the present disclosure.
Figure 23:
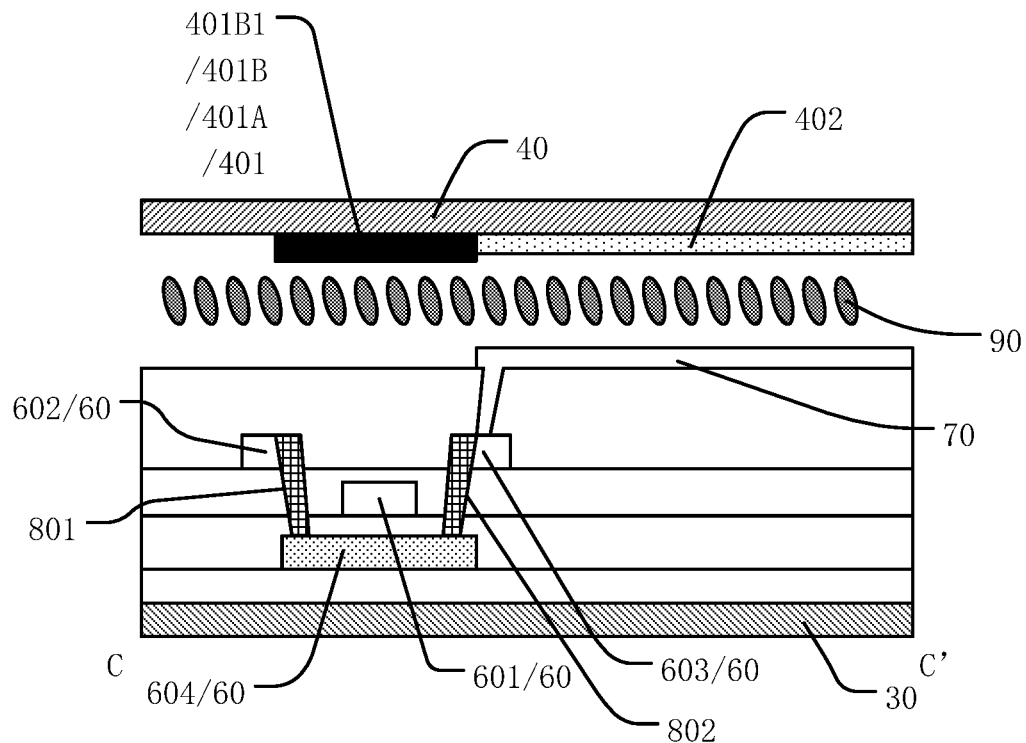
FIG. 23 illustrates a C-C' sectional view of an exemplary structure in FIG. 22 consistent with disclosed embodiments of the present disclosure.

FIG. 22 illustrates a schematic local zoom-in top-view of another second display region in FIG. 2 and FIG. 15, and FIG. 23 illustrates a C-C' sectional view of a structure in FIG. 22. To clearly illustrate the structure of the first shielding element 401A and the second shielding element 401B, FIG. 22 illustrates transparency filling. FIG. 23 illustrates the thin film transistor 60 having a top gate structure as an example. In specific implementation, the thin film transistor 60 may have a bottom gate structure, which may not be limited by the present disclosure.

In certain embodiments, the second substrate 40 in the second display region AA2 may be further provided with a second shielding element 401B. The second shielding element 401B may include a plurality of third sub-elements 401B1. The orthographic projection of the third sub-element 401B1 on the first substrate 30 may cover the orthographic projection of the active part 604 on the first substrate 30.

Optionally, the second shielding element 401B and the first shielding element 401A may be formed in one-piece, in other words, the second shielding element 401B may be multiplexed as the first shielding element 401A. Alternatively, the second shielding element 401B and the first shielding element 401A may be separately and independently formed, which may be determined according to actual needs in practical applications. For illustrative purposes, FIG. 22 and FIG. 23 illustrates that the second shielding element 401B and the first shielding element 401A are formed in one-piece as an example.

Because the transmittance of the second display region AA2 is substantially high, the second shielding element 401B may be disposed above the active part 604 of each thin film transistor 60 in the second display region AA2. Specifically, the second shielding element 401B may include the plurality of third sub-elements 401B1. The orthographic projection of the third sub-element 401B1 on the first substrate 30 may cover the orthographic projection of the active part 604 on the first substrate 30, and the third sub-element 401B1 may be configured to shield the external ambient light, thereby preventing the external ambient light from irradiating the active part 604 of the thin film transistor 60 and affecting the normal driving operation of the thin film transistor 60, which may improve the display effect of the display panel 000.

Optionally, the shape of the third sub-element 401B1 may be designed according to the shape of the orthographic projection of the active part 604 on the first substrate 30. For example, when the orthographic projection of the active part 604 on the first substrate 30 has a U-shaped structure, the shape of the third sub-element 401B1 may be correspondingly set, to achieve the shielding of the external ambient light.

The second shielding element 401B may be made of a shading material, and may be formed in a same layer and made of a same material as the black matrix layer 401 on the second substrate 40. When the display panel is a panel with a COA structure (black matrix layer 401 and the color resist 402 may be formed over the first substrate 30 on a same side of the thin film transistor 60), the second shielding element 401B may be formed on the first substrate 30, and may be determined according to actual requirements in practical applications.

In certain embodiments, referring to FIGS. 1-3, FIGS. 14-15 and FIGS. 22-23, the orthographic projection of the third sub-element 401B1 on the first substrate 30 may have an area greater than the orthographic projection of the active part 604 on the first substrate 30.

The second shielding element 401B for shielding and preventing external ambient light from affecting the active part 604 may be set to be as wide as possible. In other words, the orthographic projection of the third sub-element 401B1 on the first substrate 30 may have an area greater than the orthographic projection of the active part 604 on the first substrate 30, to effectively shield the external ambient light, to effectively prevent the external ambient light from affecting the active part 604, and to be further prevented from affecting optical quality and the display effect of the display panel 000.

Figure 24:
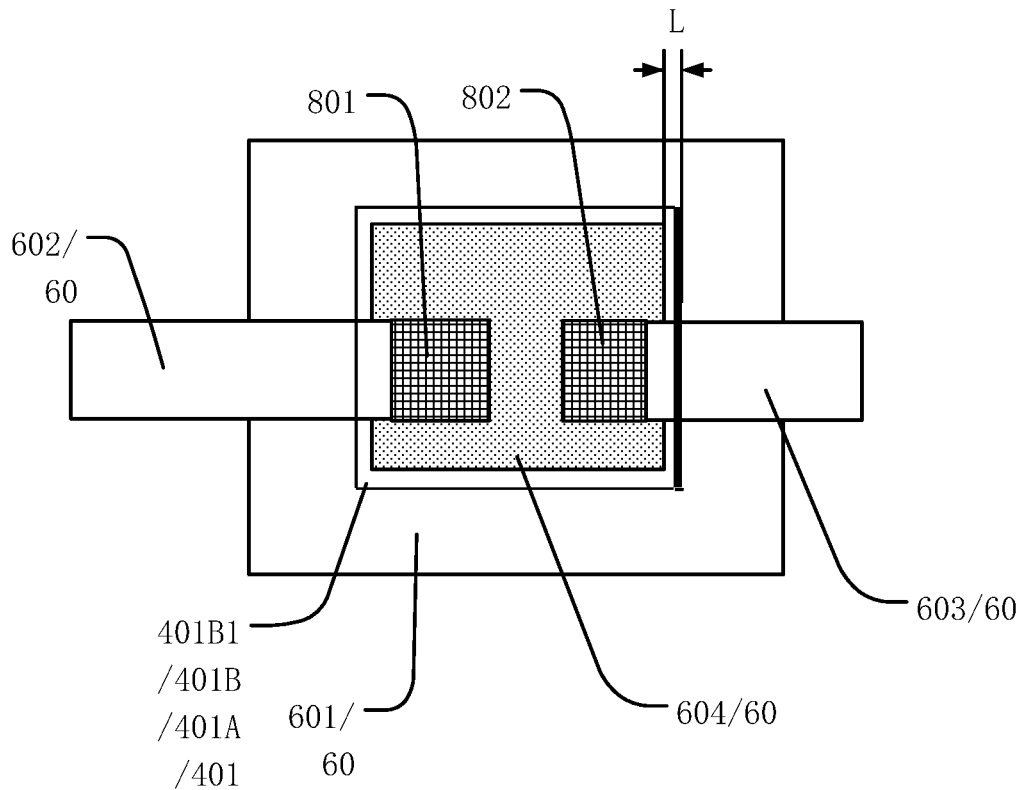
FIG. 24 illustrates a local zoom-in view of an exemplary thin-film transistor region in FIG. 22 consistent with disclosed embodiments of the present disclosure.

FIG. 24 illustrates a local zoom-in view of a thin-film transistor region in FIG. 22. In certain embodiments, referring to FIGS. 1-3, FIGS. 14-15 and FIGS. 22-24, in a same second sub-pixel 201, the orthographic projection of the third sub-element 401B1 on the first substrate 30 may be a fifth projection, and the orthographic projection of the active part 604 on the first substrate 30 may be a sixth projection. The distance between the boundary of the fifth projection and the boundary of the sixth projection may be L, where $1 \mu m \leq L \leq 3 \mu m$.

The second shielding element 401B for shielding and preventing external ambient light from affecting the active part 604 may be set to be as wide as possible. In other words, the orthographic projection of the third sub-element 401B1 on the first substrate 30 may have an area greater than the orthographic projection of the active part 604 on the first substrate 30, to effectively shield the external ambient light, to effectively prevent the external ambient light from affecting the active part 604, and to be further prevented from affecting optical quality and the display effect of the display panel 000.

In related process, when the first substrate 30 and the second substrate 40 are aligned in a box, alignment error may be likely to occur, causing the first substrate 30 and the second substrate 40 to be misaligned. Therefore, in the present disclosure, in a same second sub-pixel 201, the orthographic projection of the third sub-element 401B1 on the first substrate 30 may be the fifth projection, and the orthographic projection of the active part 604 on the first substrate 30 may be the sixth projection. The distance L between boundary of the fifth projection and boundary of the sixth projection may be greater than or equal to 1 µm. Therefore, even in a case where alignment error occurs, the third sub-element 401B1 may also block the external ambient light, to avoid affecting the performance of the active part 604. At the same time, when the external ambient light enters the display panel from a direction with a large viewing angle (the light that is at an angle greater than 60° with respect to the light that perpendicularly enters the light-emitting surface of the display panel), the light intensity may often be weak. Therefore, through setting $L \leq 3 \mu m$, the second shielding element 401B may be prevented from occupying too much area of the second display region AA2 while enabling the third sub-element 401B1 to shield the external ambient light, and, thus, the transmittance of the second display region AA2 may not be affected, and the imaging quality of the photosensitive element may not be affected.

In certain embodiments, referring to FIGS. 1-4, the signal line 50 in the first display region AA1 may be made of a material different from the signal line 50 in the second display region AA2. Optionally, the signal line 50 in the first display region AA1 may be made of a non-transparent conductive material (e.g., a metal conductive material), and the signal line 50 in the second display region AA2 may be made of a transparent conductive material.

In the present disclosure, the first substrate 30 of the display panel 000 may be provided with a plurality of signal lines 50. The signal lines 50 may include a scan line G and a data line S, or any other signal line capable of transmitting display driving signal, which may not be limited herein. For illustrative purposes, the first substrate 30 may be an array substrate as an example. In a specific implementation, the first substrate 30 may be an array substrate including a plurality of color resists and a black matrix layer, which may not be limited herein. The scan lines G and data lines S may be isolated and crossed to define regions where the first sub-pixel 101, the second sub-pixel 201, and the third sub-pixel 202 are located.

As disclosed, the signal line 50 in the second display region AA2 is made of an exemplary transparent conductive material. In contrast, when the signal line was made of a non-transparent material, a regular array pattern may be formed in the second display region AA2 of the display panel 000, and a grating may then be formed. By using the disclosed transparent conductive material for the signal line 50, when the second display region AA2 is multiplexed as a photosensitive element disposure region, the diffraction and interference phenomenon of the grating under the action of light upon operation of the photosensitive element may be prevented or reduced, thereby facilitating to increase the screen-to-body ratio, and to improve the use effect of the photosensitive element (such as the camera) while improving the display effect of the full-screen.

In the present disclosure, the signal line 50 in the first display region AA1 may be made of a material different from the signal line 50 in the second display region AA2. Optionally, the signal line 50 in the first display region AA1 may be made of a non-transparent conductive material, which may avoid the problems of high resistivity and high power consumption caused by the entire signal lines 50 of the display panel 000 being made of transparent conductive material. Therefore, in the present disclosure, the signal line 50 in the first display region AA1 may be made of a non-transparent conductive material, and the signal line 50 in the second display region AA2 may be made of a transparent conductive material. Therefore, the signal lines 50 made of the non-transparent material may be prevented from forming a regular array pattern in the second display region AA2 of the display panel 000, and may not form a grating. The diffraction and interference phenomenon may be prevented from occurring, and the power consumption of the display panel may be reduced.

Figure 25:
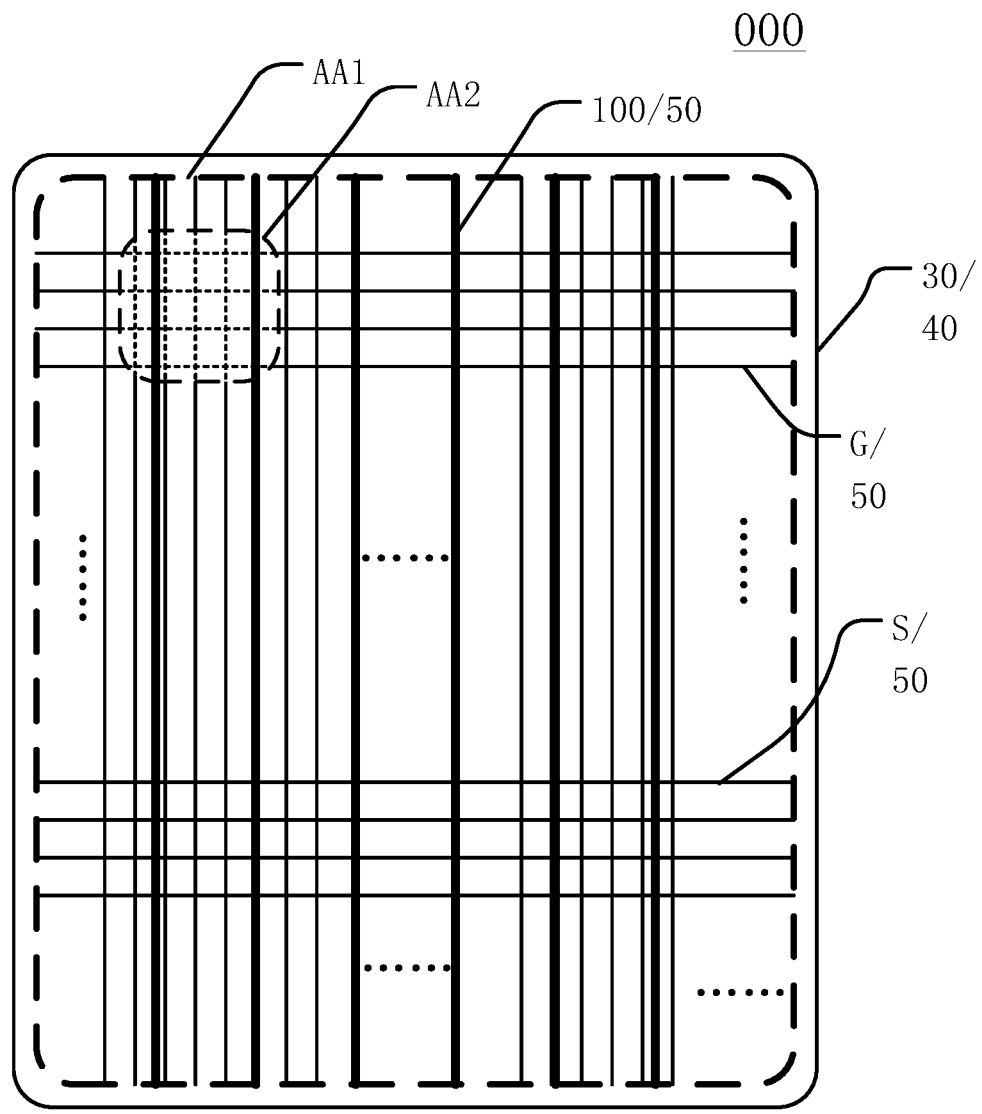
FIG. 25 illustrates a schematic top-view of another exemplary display panel consistent with disclosed embodiments of the present disclosure.
Figure 26:
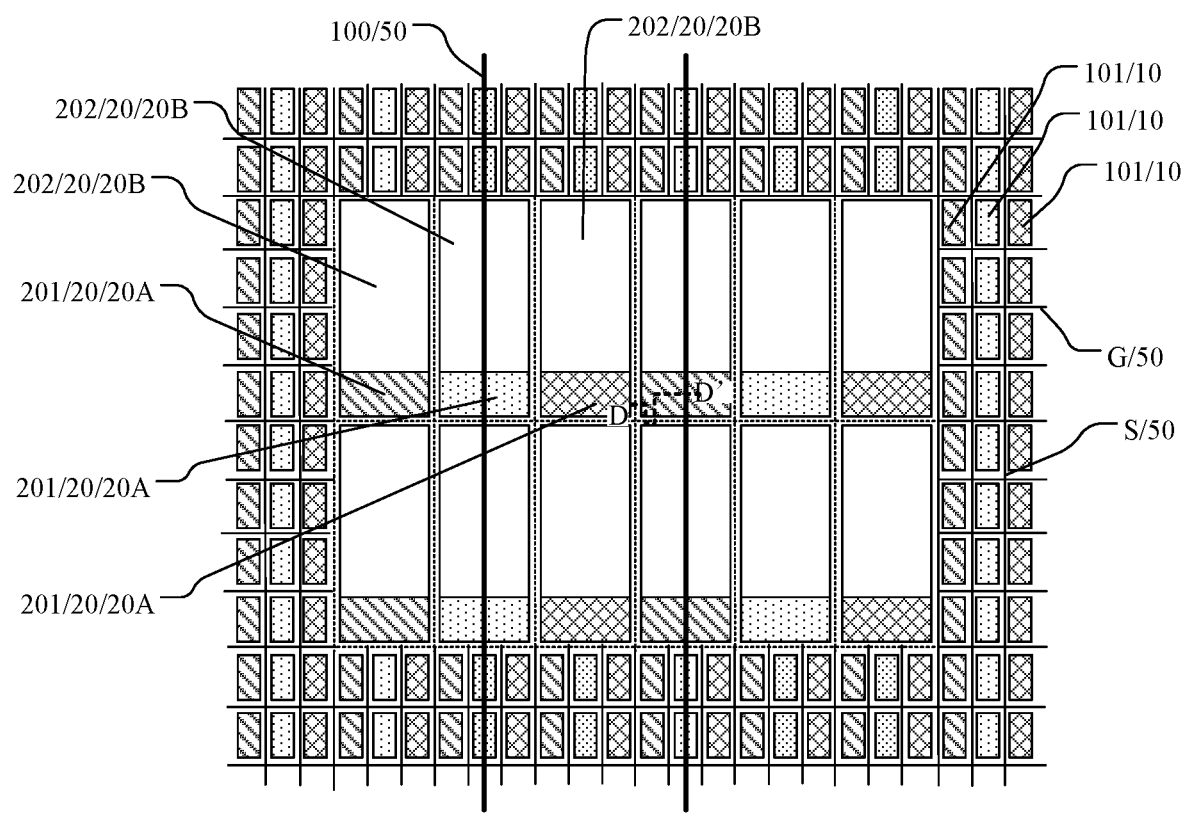
FIG. 26 illustrates a local zoom-in view of an exemplary structure in FIG. 25 consistent with disclosed embodiments of the present disclosure.
Figure 27:
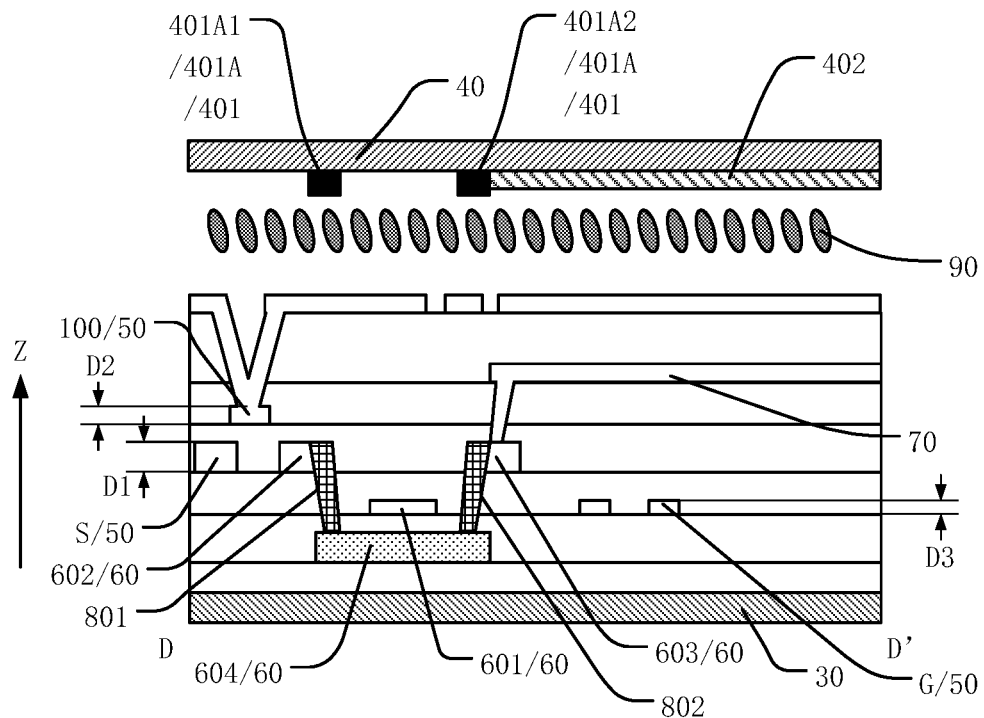
FIG. 27 illustrates a D-D' sectional view of an exemplary structure in FIG. 26 consistent with disclosed embodiments of the present disclosure.

FIG. 25 illustrates a schematic top-view of another display panel consistent with disclosed embodiments of the present disclosure, FIG. 26 illustrates a local zoom-in view of a structure in FIG. 25, and FIG. 27 illustrates a D-D' sectional view of a structure in FIG. 26. In certain embodiments, referring to FIGS. 25-27, the signal lines 50 may further include a touch control line 100. The touch control line 100 may be disposed over the first substrate 30. Optionally, the first substrate 30 may include a plurality of touch control electrode blocks (may be multiplexed as a common electrode layer). Each touch control electrode block may be electrically connected to at least one touch control line 100 through a via.

In a direction Z perpendicular to the first substrate 30, a thickness D1 of the data line S may be greater than a thickness D2 of the touch control line 100, and the thickness D2 of the touch control line 100 may be greater than a thickness D3 of the scan line G. Optionally, the signal lines 50 in the second display region AA2, such as the scan line G, the data line S, and the touch control line 100, may be made of any conductive metal with high transmittance such as ITO, and the thickness of the transparent conductive layer made of ITO may be in a range of approximately 35 nm-350 nm. In one embodiment, the thickness D1 of the data line S may be approximately 300 nm, the thickness D2 of the touch control line 100 may be approximately 200 nm, and the thickness D3 of the scan line G may be approximately 190 nm.

The display panel 000 may also have a touch control function. The signal lines 50 may further include a plurality of touch control lines 100. The entire touch control lines 100 may be disposed over the first substrate 30 of the display panel 000, and at least one touch control line 100 may be electrically connected to the touch control electrode block. Touch control signals may be provided for each touch control electrode block of the display panel 000 through the touch control line 100, to achieve the touch control function of the display panel.

In the present disclosure, in the direction Z perpendicular to the first substrate 30, the thickness D1 of the data line S may be greater than the thickness D2 of the touch control line 100, and the thickness D2 of the touch control line 100 may be greater than the thickness D3 of the scan line G. In other words, the thickness D1 of the data line S may be substantially large, which may enable the data line S to have desired electrical conductivity and substantially high stability, and to be less likely disturbed by any other electrical fluctuations.

The thickness D2 of the touch control line 100 may be greater than the thickness D3 of the scan line G, which may enable the impedance of the touch control line 100 to be substantially small, and may facilitate to improve the touch control accuracy of the display panel 000. The signal line 50 made of a transparent material with a different thickness may have different transmittance. Therefore, in the present disclosure, in the direction Z perpendicular to the first substrate 30, the thickness D1 of the data line S may be greater than the thickness D2 of the touch control line 100, and the thickness D2 of the touch control line 100 may be greater than the thickness D3 of the scan line G. The thickness D1 of the data line S, the thickness D2 of the touch control line 100, and the thickness D3 of the scan line G may be limited, which may eliminate the uniformity in the thickness of the signal lines 50, and when the second display region AA2 is multiplexed as the photosensitive element disposure region, may facilitate to eliminate the diffraction and interference phenomena that occur under the action of light when the photosensitive element is working as much as possible.

In the present disclosure, different signal line 50 in different film layer of the display panel may have a different thickness; and/or, in the same second pixel 20, the orthographic projection of at least one second sub-pixel 201 on the first substrate 30 may have an irregular shape, a different area or a combination thereof; and/or, the signal line 50 in the second display region AA2 may be made of a transparent conductive material. When the second display region AA2 is multiplexed as a photosensitive element disposure region, the present disclosure may prevent or reduce the diffraction and interference phenomenon of the grating under the action of light when the photosensitive element is working, thereby facilitating to increase the screen-to-body ratio, to improve the full-screen display effect, and to improve the use effect of the photosensitive element such as the camera.

Figure 28:
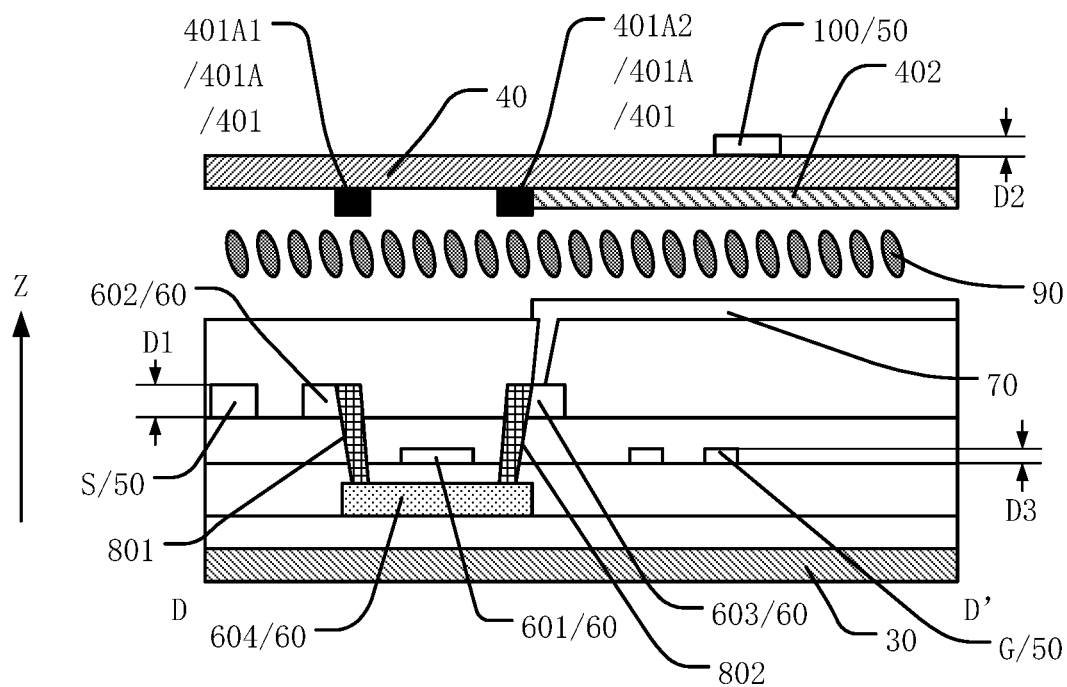
FIG. 28 illustrates a D-D' sectional view of another exemplary structure in FIG. 26 consistent with disclosed embodiments of the present disclosure.

The touch control line 100 in the present disclosure may be disposed over the first substrate 30. The common electrode layer may be multiplexed as touch control electrode blocks, and the touch control function of the display panel may be achieved by connecting the touch control electrode block through the touch control line 100, while which may not be limited to such structure, and may have any other structure. FIG. 28 illustrates a D-D' sectional view of another structure in FIG. 26. The difference between the embodiment associated with FIG. 28 and the embodiment associated with FIG. 27 may include that the signal lines 50 in the embodiment associated with FIG. 28 may include the touch control lines 100, and the touch control lines 100 may be disposed over the second substrate 40. The embodiment associated with FIG. 28 may have the same beneficial effects as the foregoing embodiment, which may refer to the detailed description of the beneficial effects of the display panel 000 in the embodiment associated with FIG. 27, and may not be repeated herein.

Figure 29:
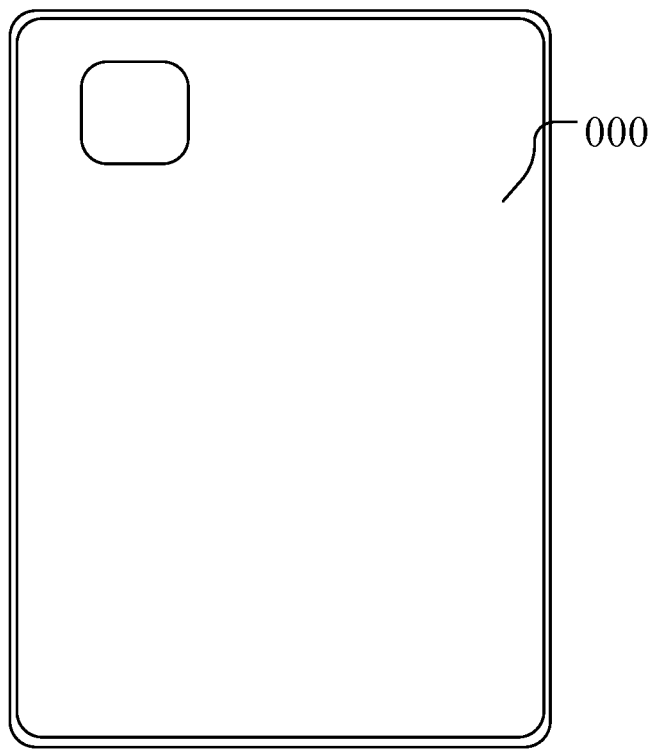
FIG. 29 illustrates a schematic top-view of an exemplary display device consistent with disclosed embodiments of the present disclosure.

FIG. 29 illustrates a schematic top-view of a display device consistent with disclosed embodiments of the present disclosure. In certain embodiments, referring to FIG. 29, the display device 111 may include the display panel 000 provided in the above-disclosed embodiments of the present disclosure. For illustrative purposes, FIG. 29 illustrates a mobile phone as an example to describe the display device 111. The display device 111 may also be a computer, a television, a vehicle-mounted display device, or any other display device 111 with a display function, which may not be limited by the present disclosure. The display device 111 may have the beneficial effects of the display panel 000 provided in the disclosed embodiments of the present disclosure, which may refer to related description of the display panel 000 in the above-disclosed embodiments, and may not be repeated herein.

The disclosed display panel and display device may have following beneficial effects. The display panel in the present disclosure may include the first display region and the second display region that are arranged adjacent to each other. The second display region may be multiplexed as the photosensitive element disposure region while achieving the display function. A photosensitive element such as a camera may be disposed in the second display region. The first display region may include a plurality of first pixels arranged in an array. The first pixel may include a plurality of first sub-pixels with different colors. The second display region may include a plurality of second pixels arranged in an array.

When the photosensitive element is not working, the first sub-pixel, the second sub-pixel, and the third sub-pixel may jointly work, and the second display region and the first display region may display an image together to achieve the full-screen display effect of the display panel. When the photosensitive element is working, the second region of the second pixel in the second display region may be in a transparent state. In view of this, the photosensitive element disposed in the second display region may receive the external light passing through the second region of the second pixel to achieve the preset function.

The first substrate of the display panel may be provided with a plurality of signal lines. The signal lines may include a scan line, a data line, and any other signal line capable of transmitting display driving signal. The signal line in the second display region may be made of an exemplary transparent conductive material. In contrast, when the signal line was made of a non-transparent material, a regular array pattern may be formed in the second display region of the display panel, and a grating may then be formed. By using the disclosed transparent conductive material for the signal line, when the second display region is multiplexed as a photosensitive element disposure region, the diffraction and interference phenomenon of the grating under the action of light upon operation of the photosensitive element may be prevented or reduced, thereby facilitating to increase the screen-to-body ratio, and to improve the use effect of the photosensitive element (such as the camera) while improving the display effect of the full-screen.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments illustrated herein but is to be accorded the widest scope consistent with the principles and novel features disclosed herein.

What is claimed is:

1. A display panel, comprising:
   a first display region and a second display region that are arranged adjacent to each other, wherein:
   the second display region is multiplexed as a photosensitive element disposure region,
   the first display region includes a plurality of first pixels arranged in an array, and a first pixel of the plurality of first pixels includes a plurality of first sub-pixels with different colors,
   the second display region includes a plurality of second pixels arranged in an array, and a second pixel of the plurality of second pixels includes a first region and a second region, wherein the first region has an area less than the second region, and
   the first region includes a number of second sub-pixels with different colors, and the second region includes a same number of third sub-pixels with one or more colors, wherein a first sub-pixel, having a first color, of the plurality of first sub-pixels, has an area less than a second sub-pixel, having the same first color, of the plurality of second sub-pixels, and a first sub-pixel, having a second color, of the plurality of first sub-pixels, has an area less than a second sub-pixel, having the same second color, of the plurality of second sub-pixels, and the second sub-pixel having the first color or the second color has an area less than a third sub-pixel of the plurality of third sub-pixels, wherein the second color is different from the first color; and
   a first substrate and a second substrate that are oppositely disposed, wherein the first substrate is provided with a plurality of signal lines, the plurality of signal lines at least include scan lines and data lines, and the scan lines and the data lines are isolated and crossed to define regions where the first sub-pixel, the second sub-pixel, and the third sub-pixel are located, wherein:
   a signal line of the plurality of signal lines in the second display region is made of a transparent conductive material.

2. The display panel according to claim 1, wherein:
   one of the first substrate and the second substrate is further provided with a plurality of color resists and a black matrix layer, wherein:
   the black matrix layer in the first display region includes a plurality of openings, and a color resist of the plurality of color resists in the first display region is located in an opening of the plurality of openings, and
   the black matrix layer in the second display region includes a hollow-out part, such that at least one of the plurality of color resists in the second display region is not surrounded by the black matrix layer, wherein an orthographic projection of the hollow-out part on the second substrate overlaps the second display region.

3. The display panel according to claim 1, wherein:
   in a same second pixel, orthographic projections of the plurality of second sub-pixels with different colors on the first substrate have a same area, and an orthographic projection of at least one second sub-pixel of the plurality of second sub-pixels on the first substrate has a shape different from an orthographic projection of any other second sub-pixel on the first substrate.

4. The display panel according to claim 1, wherein:
   in a same second pixel, orthographic projections of the plurality of second sub-pixels with different colors on the first substrate have a same shape, and an orthographic projection of at least one second sub-pixel of the plurality of second sub-pixels on the first substrate has an area different from an orthographic projection of any other second sub-pixel on the first substrate.

5. The display panel according to claim 1, wherein:
   in a same second pixel, an orthographic projection of at least one second sub-pixel of the plurality of second sub-pixels on the first substrate has a shape different from an orthographic projection of any other second sub-pixel on the first substrate, and an orthographic projection of at least one second sub-pixel of the plurality of second sub-pixels on the first substrate has an area different from an orthographic projection of any other second sub-pixel on the first substrate.

6. The display panel according to claim 5, wherein:
   a same second pixel includes three second sub-pixels with different colors, and an area ratio of orthographic projections of the three second sub-pixels with different colors on the first substrate is approximately 2:1:3.

7. The display panel according to claim 1, wherein:
in a same second pixel, a shape of an orthographic projection of at least one second sub-pixel of the plurality of second sub-pixels on the first substrate has an irregular pattern.

8. The display panel according to claim 1, wherein:
a signal line of the plurality of signal lines in the first display region is made of a same material as the signal line of the plurality of signal lines in the second display region.

9. The display panel according to claim 1, wherein:
the second sub-pixel includes a thin film transistor and a pixel electrode that are electrically connected to each other, wherein:
 the thin film transistor includes a gate electrode, a source electrode, a drain electrode, and an active part,
 the gate electrode is electrically connected to a scan line,
 one end of the source electrode is electrically connected to a data line, and another end of the source electrode is electrically connected to the active part,
 one end of the drain electrode is electrically connected to the pixel electrode, and another end of the drain electrode is electrically connected to the active part, and
 the gate electrode is disposed in a same layer as the scan line, and the source electrode and the drain electrode are disposed in a same layer as the data line.

10. The display panel according to claim 9, wherein:
the source electrode is electrically connected to the active part through a first via, and the drain electrode is electrically connected to the active part through a second via; and
the source electrode at a position of the first via and the drain electrode at a position of the second via are made of a non-transparent conductive material.

11. The display panel according to claim 10, wherein:
the second substrate in the second display region is further provided with a first shielding element, and the first shielding element includes a plurality of first sub-elements and a plurality of second sub-elements, wherein an orthographic projection of a first sub-element on the first substrate covers an orthographic projection of the first via on the first substrate, and an orthographic projection of a second sub-element on the first substrate covers an orthographic projection of the second via on the first substrate.

12. The display panel according to claim 11, wherein:
the orthographic projection of the first sub-element on the first substrate has an area greater than the orthographic projection of the first via on the first substrate, and the orthographic projection of the second sub-element on the first substrate has an area greater than the orthographic projection of the second via on the first substrate.

13. The display panel according to claim 11, wherein:
in a same second sub-pixel, the orthographic projection of the first sub-element on the first substrate is a first projection, and the orthographic projection of the first via on the first substrate is a second projection, wherein a distance between a boundary of the first projection and a boundary of the second projection is less than or equal to 1 μm; and
in a same second sub-pixel, the orthographic projection of the second sub-element on the first substrate is a third projection, and the orthographic projection of the second via on the first substrate is a fourth projection, wherein a distance between a boundary of the third projection and a boundary of the fourth projection is less than or equal to 1 μm.

14. The display panel according to claim 10, wherein:
the second substrate in the second display region is further provided with a second shielding element, and the second shielding element includes a plurality of third sub-elements, wherein an orthographic projection of a third sub-element on the first substrate covers an orthographic projection of the active part on the first substrate.

15. The display panel according to claim 14, wherein:
the orthographic projection of the third sub-element on the first substrate has an area greater than the orthographic projection of the active part on the first substrate.

16. The display panel according to claim 14, wherein:
in a same second sub-pixel, the orthographic projection of the third sub-element on the first substrate is a fifth projection, and the orthographic projection of the active part on the first substrate is a sixth projection, wherein a distance between a boundary of the fifth projection and a boundary of the sixth projection is L, and 1 μm≤L≤3 μm.

17. The display panel according to claim 1, wherein:
a signal line of the plurality of signal lines in the first display region is made of a material different from the signal line of the plurality of signal lines in the second display region.

18. The display panel according to claim 17, wherein:
the signal line in the first display region is made of a non-transparent conductive material.

19. The display panel according to claim 1, wherein:
the plurality of signal lines further include a touch control line, wherein:
 in a direction perpendicular to the first substrate, a thickness of a data line is greater than a thickness of the touch control line, and the thickness of the touch control line is greater than a thickness of a scan line.

20. The display panel according to claim 1, wherein:
light outputted from the plurality of third sub-pixels in the second region has a white color;
the plurality of first sub-pixels with different colors of each first pixel includes a first red sub-pixel, a first green sub-pixel, and a first blue sub-pixel; and
the plurality of second sub-pixels with different colors of each second pixel includes a second red sub-pixel, a second green sub-pixel, and a second blue sub-pixel.

21. A display device, comprising:
a display panel, wherein the display panel includes:
a first display region and a second display region that are arranged adjacent to each other, wherein:
 the second display region is multiplexed as a photo-sensitive element disposure region,
 the first display region includes a plurality of first pixels arranged in an array, and a first pixel of the plurality of first pixels includes a plurality of first sub-pixels with different colors,
 the second display region includes a plurality of second pixels arranged in an array, and a second pixel of the plurality of second pixels includes a first region and a second region, wherein the first region has an area less than or equal to the second region, and the first region includes a number of second sub-pixels with different colors, and the second region includes a same number of third sub-pixels with one or more colors, wherein a first sub-pixel, having a first color, of the plurality of first sub-pixels, has an area less than a second sub-pixel, having the same first color, of the plurality of second sub-pixels, and a first sub-pixel, having a second color, of the plurality of first sub-pixels, has an area less than a second sub-pixel, having the same second color, of the plurality of second sub-pixels, and the second sub-pixel having the first color or the second color has an area less than a third sub-pixel of the plurality of third sub-pixels, wherein the second color is different from the first color; and a first substrate and a second substrate that are oppositely disposed, wherein the first substrate is provided with a plurality of signal lines, the plurality of signal lines at least include scan lines and data lines, and the scan lines and the data lines are isolated and crossed to define regions where the first sub-pixel, the second sub-pixel, and the third sub-pixel are located, wherein:

a signal line of the plurality of signal lines in the second display region is made of a transparent conductive material.

\* \* \* \* \*